US006766344B2

(12) United States Patent
Dubey et al.

(10) Patent No.: US 6,766,344 B2
(45) Date of Patent: Jul. 20, 2004

(54) PROCESSING GALOIS FIELD ARITHMETIC

(75) Inventors: Pradeep K Dubey, New Delhi (IN); Charanjit Jutla, Elmsford, NY (US); Josyula R Rao, Briarcliff Manor, NY (US); Pankaj Rohatgi, New Rochelle, NY (US); Atri Rudra, New Delhi (IN); Vijay Kumar, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 09/851,236

(22) Filed: May 8, 2001

(65) Prior Publication Data

US 2003/0055858 A1 Mar. 20, 2003

(51) Int. Cl.[7] .................................................. G06F 7/00
(52) U.S. Cl. ....................................................... 708/492
(58) Field of Search ................................ 708/491–492; 380/28

(56) References Cited

U.S. PATENT DOCUMENTS

| 5,689,452 A | 11/1997 | Cameron |
| 6,581,180 B1 * | 6/2003 | Weng .......................... 714/781 |
| 2002/0157059 A1 * | 10/2002 | Gregori et al. .............. 714/777 |

OTHER PUBLICATIONS

Lidl and Niederreiter, "Introduction to Finite Fields and Their Applications", Cambridge University Press, Cambridge, MA, 1986, pp. 1–69.

Christof Paar, "Efficient VLSI Architectures for Bit–Parallel Computation in Galois Fields", Sections 2.1.2 and 2.2, PhD Thesis, Instituts for Experimental Mathematics, University of Essen, Germany, 1994.

John Daemen and Vincent Rijmen, "AES Proposal: Rijndael", available from Computer Security Resource Center, US National Institute of Standards and Technology, http:\\csrc.nist.gov, Sep. 1999.

Eli Biham, "A fast new DES implementation in Software", Technical Report CS0891, Computer Science Department, Technion–Israel Institute of Technology, 1997, 13 pages.

M.J. Flynn, "Very high–speed computing systems", Proc. of the IEEE, vol. 54, 1966, pp. 1901–1909.

A. Peleg and U. Weiser, "MMX Technology Extension to the Intel Architecture", IEEE Micro, Jul./Aug. 1996, pp. 42–50.

K. Diefendorff, P. Dubey, R. Hochsprung, and H. Scales, "AltiVec Extension to Power PC Accelerates Mediaprocessing", IEEE Micro, Mar./Apr. 2000, pp. 85–95.

Lin and Costello, "Error Control Coding", Prentice Hall, ISBN:013283796X, Oct. 1982, Chapter 6, pp. 170–176.

C.S. Jutla, "Encryption Modes with Almost Free Message Integrity", Computer Security Resource Centre, US National Institute of Standards and Technology, First Modes of Operation Workshop, Baltimore, MA, Oct. 20, 2000, 6 pages, http\\csrc.nist.gov/CrypoToolkit/modes/workshop1/papers/jutla–auth.pdf.

* cited by examiner

*Primary Examiner*—Tan V. Mai
(74) *Attorney, Agent, or Firm*—McGinn & Gibb, PLLC; T. Rao Coca, Esq.

(57) ABSTRACT

Efficient parallel processing of algorithms involving Galois Field arithmetic use data slicing techniques to execute arithmetic operations on a computing hardware having SIMD (single-instruction, multiple-data) architectures. A W-bit wide word computer capable of operating on one or more sets of k-bit operands executes Galois Field arithmetic by mapping arithmetic operations of Galois Field $GF(2^n)$ to corresponding operations in subfields lower order (m<n), which one selected on the basis of an appropriate cost function. These corresponding operations are able to be simultaneously executed on the W-bit wide computer such that the results of the arithmetic operations in Galois Field $GF(2^n)$ are obtained in k/W as many cycles of the W-bit computer compared with execution of the corresponding operations on a k-bit computer.

22 Claims, 16 Drawing Sheets

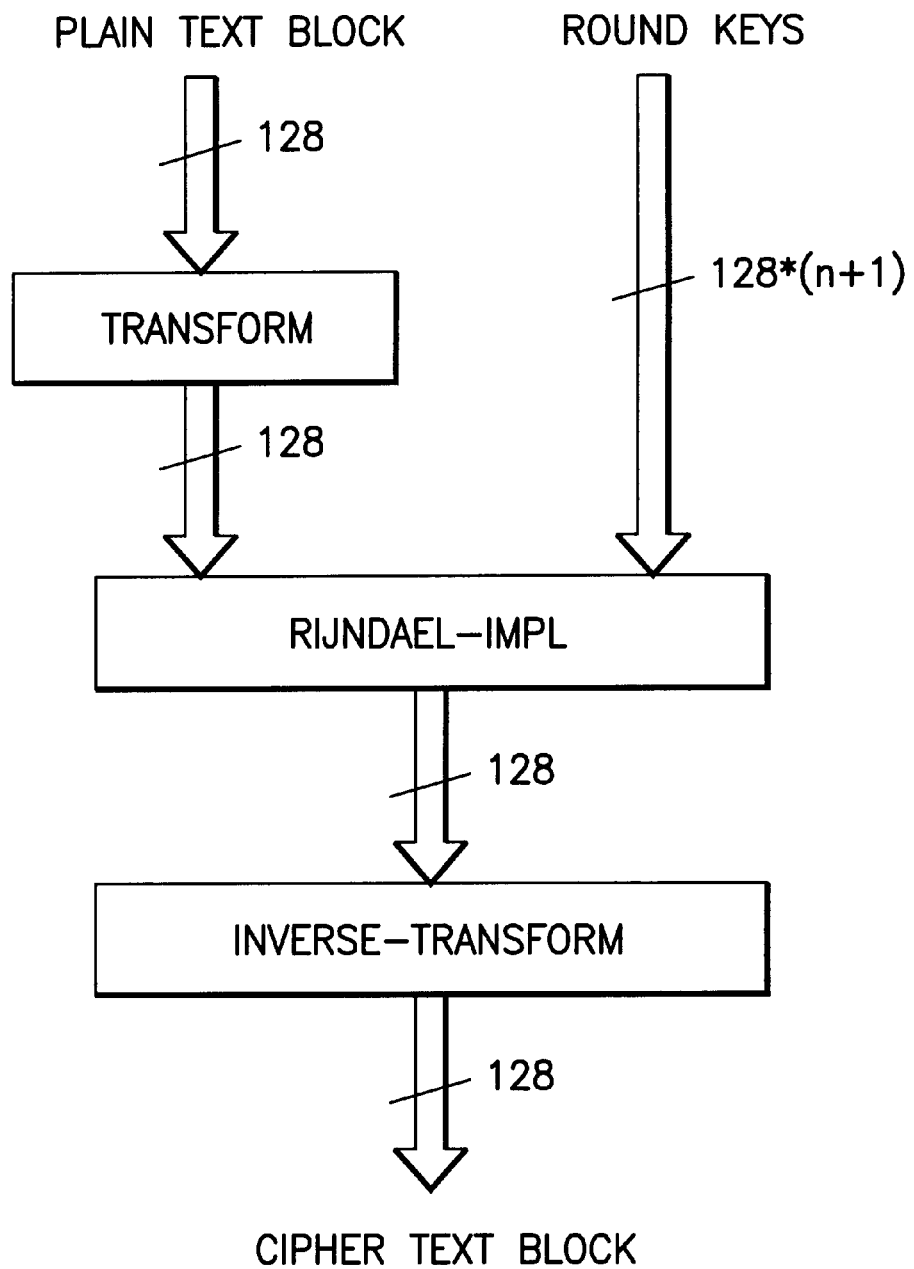
FIG.3.1

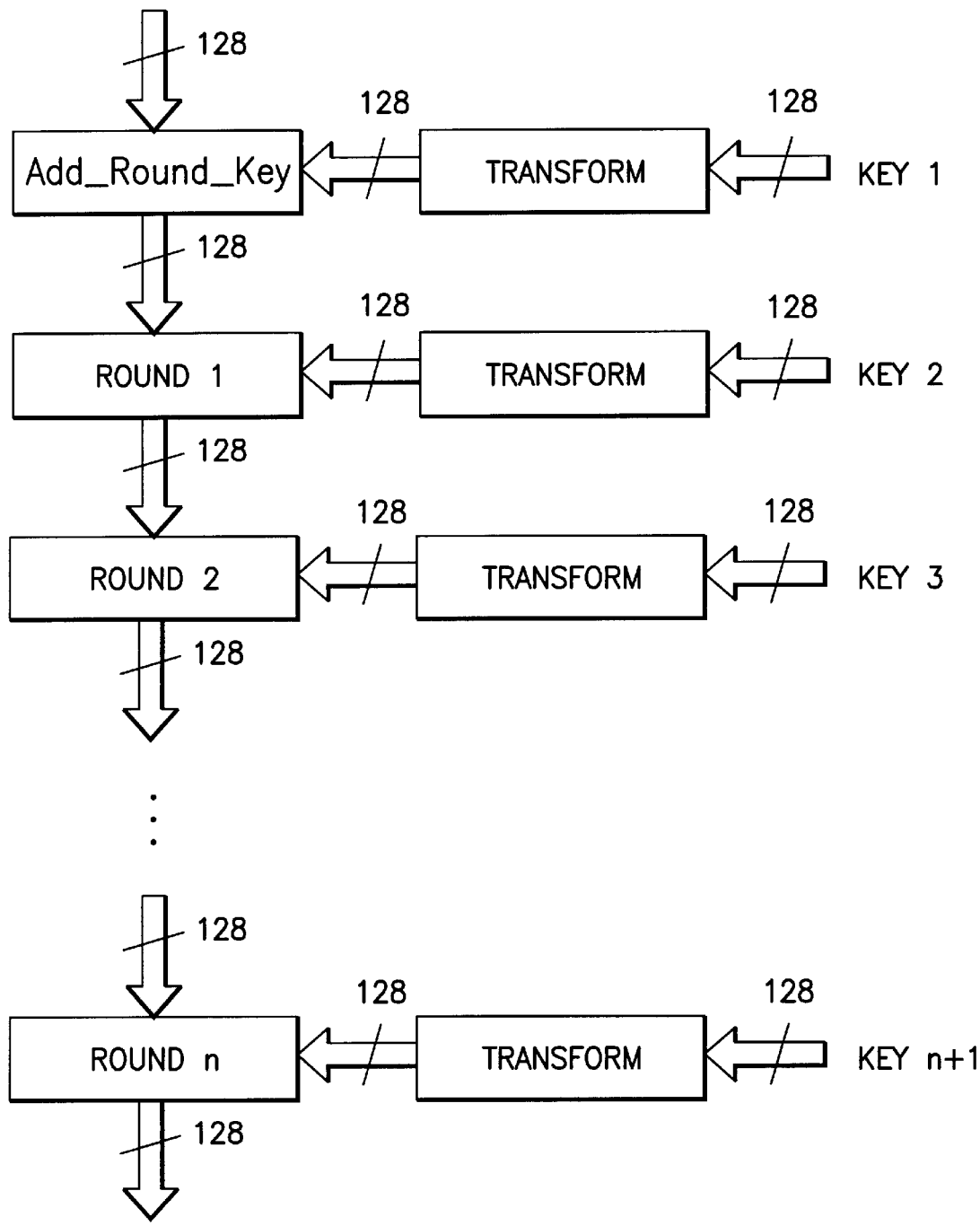
FIG.3.2

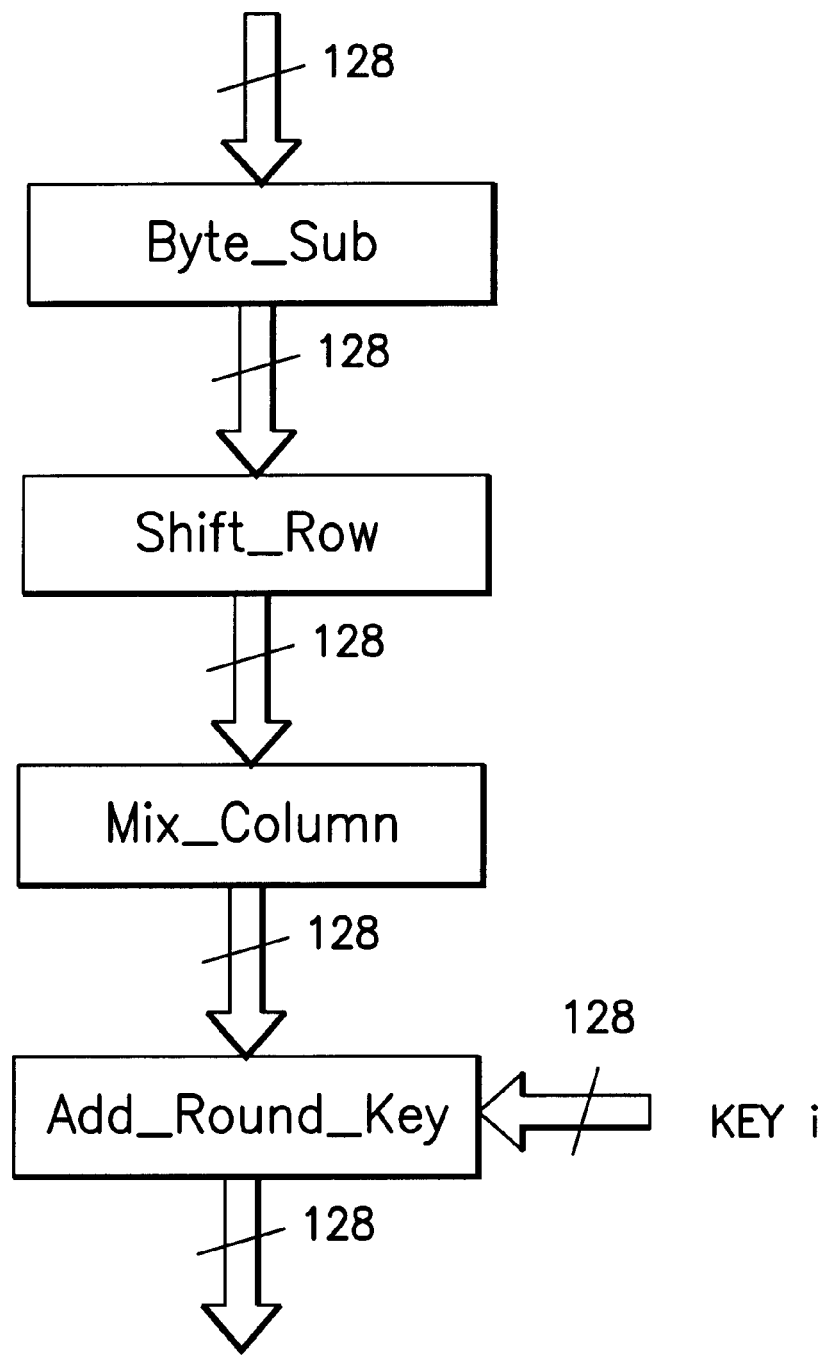
FIG.3.3A

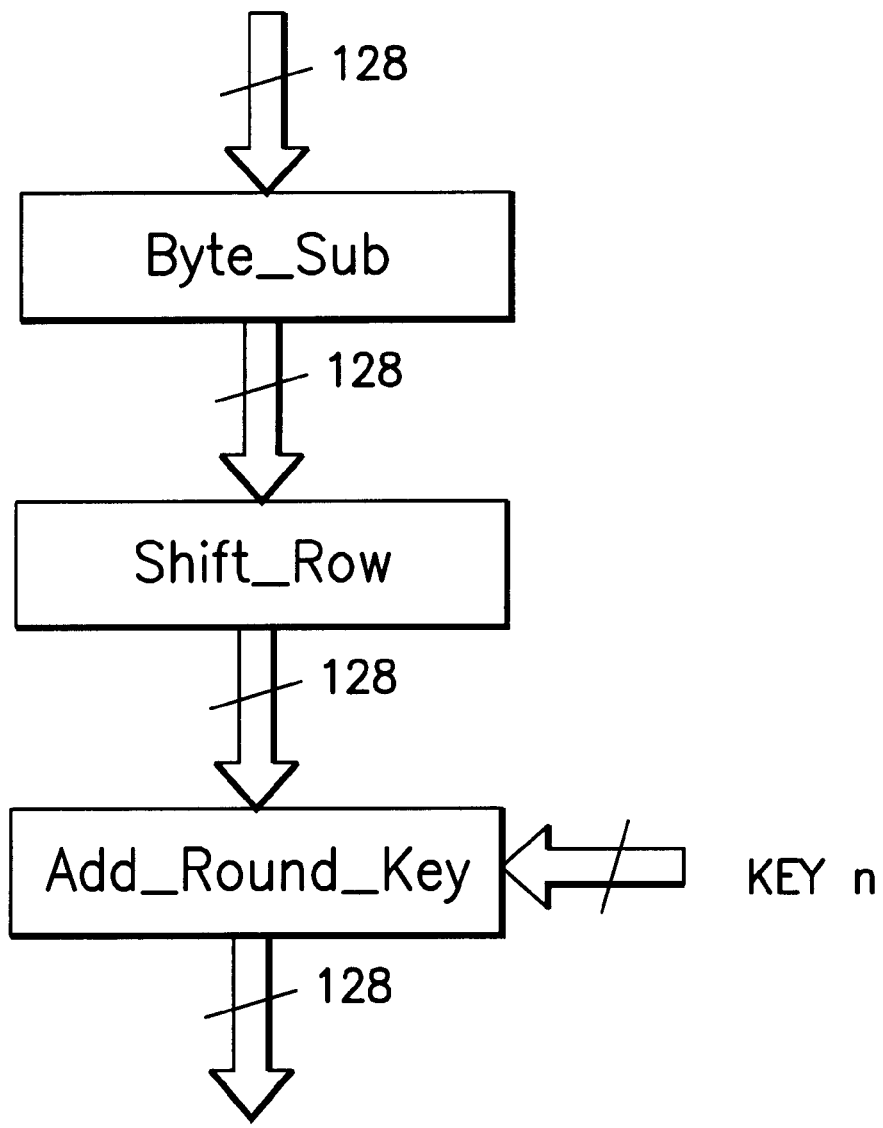
FIG.3.3B

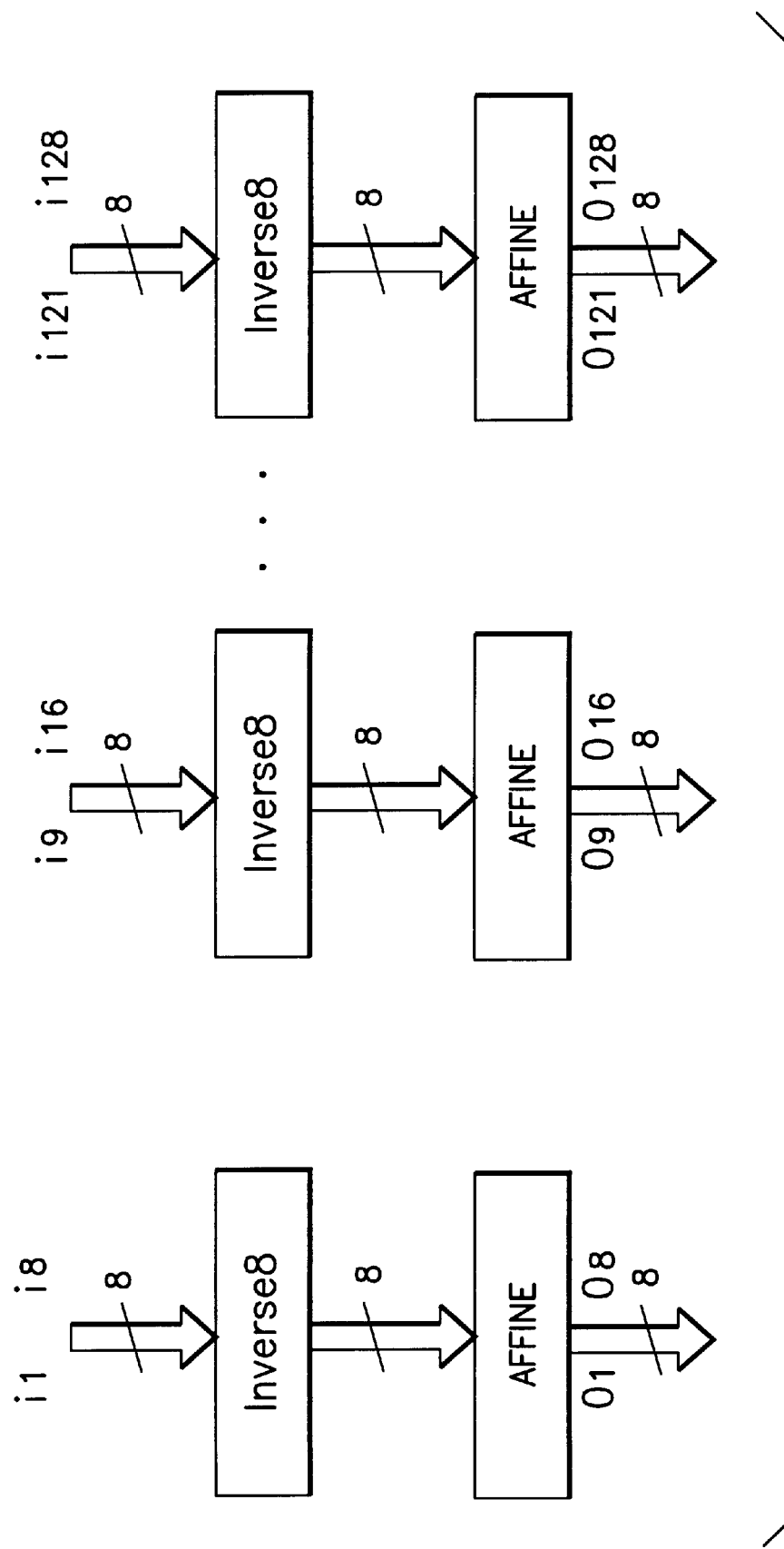
FIG.3.4

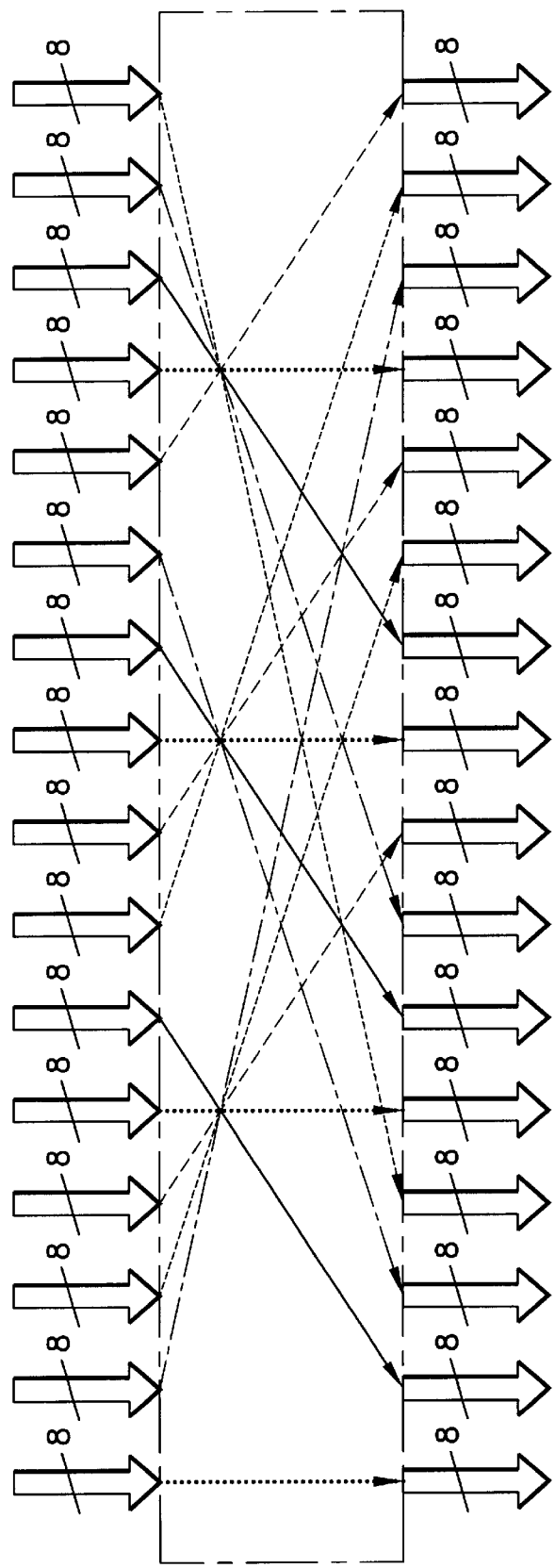
FIG.3.5

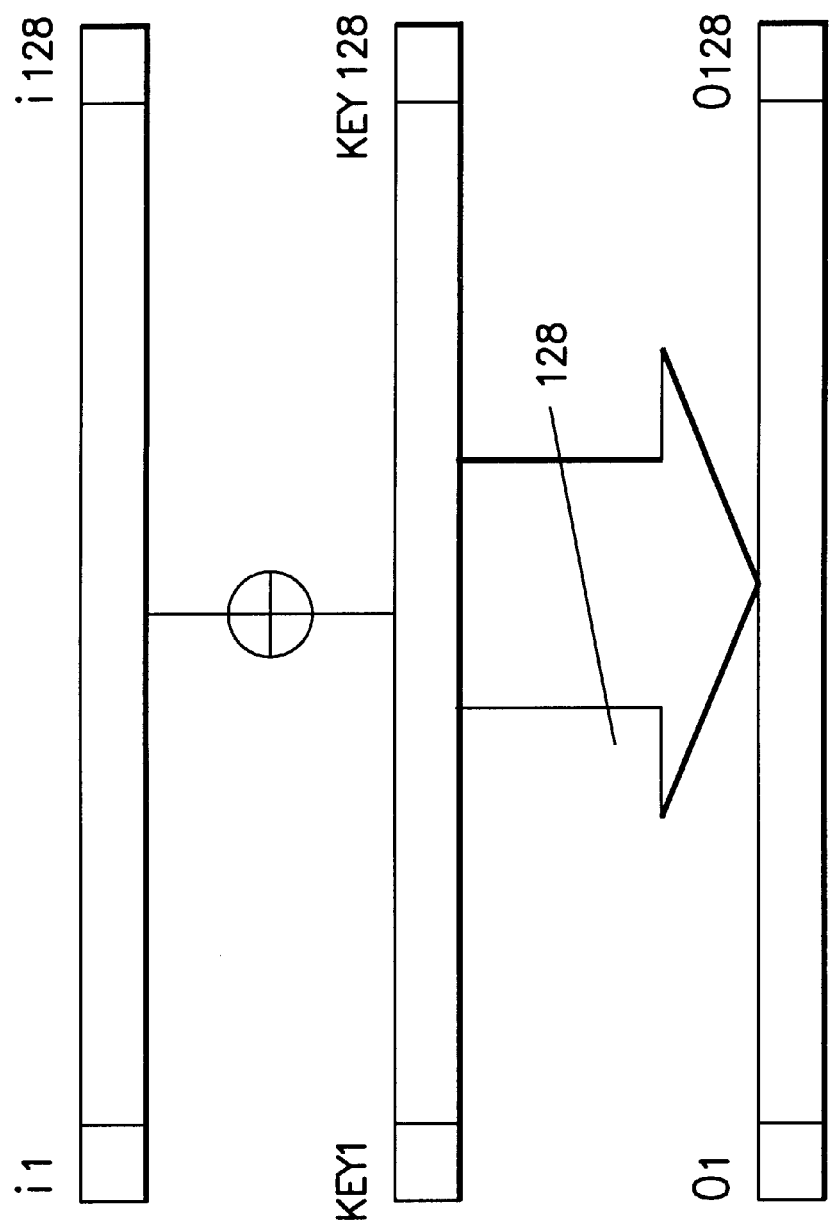
FIG.3.6

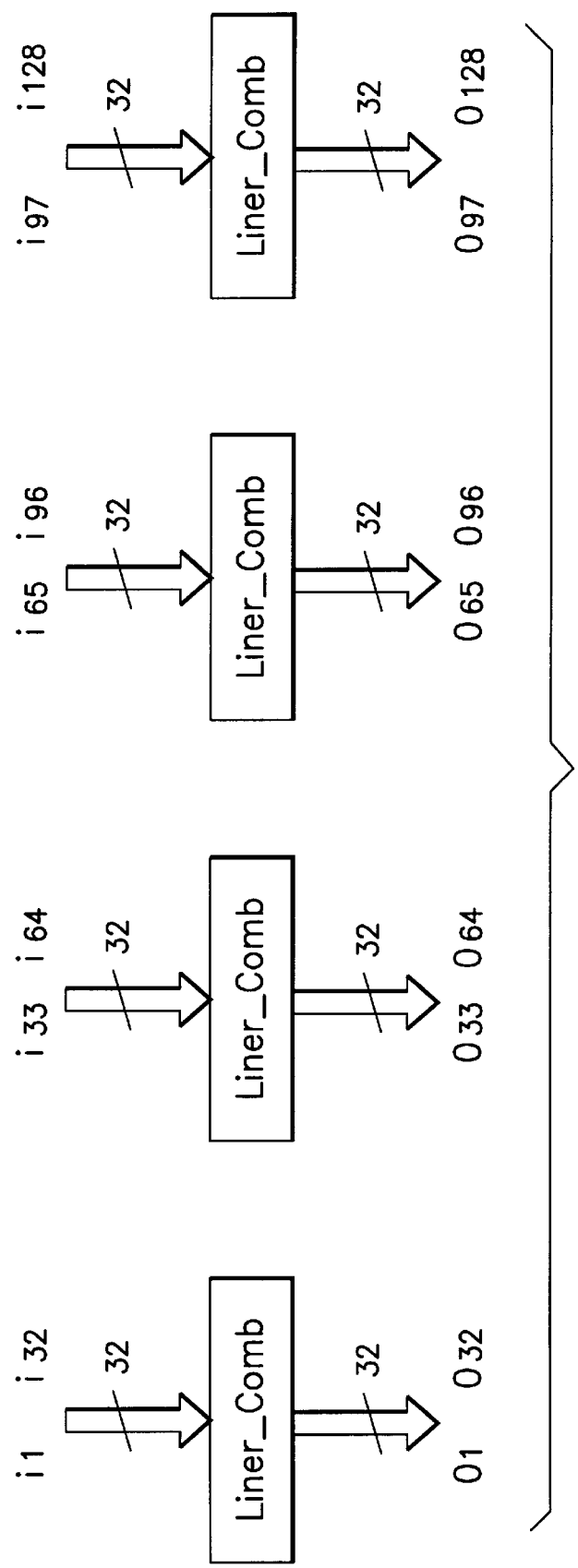
FIG.3.7

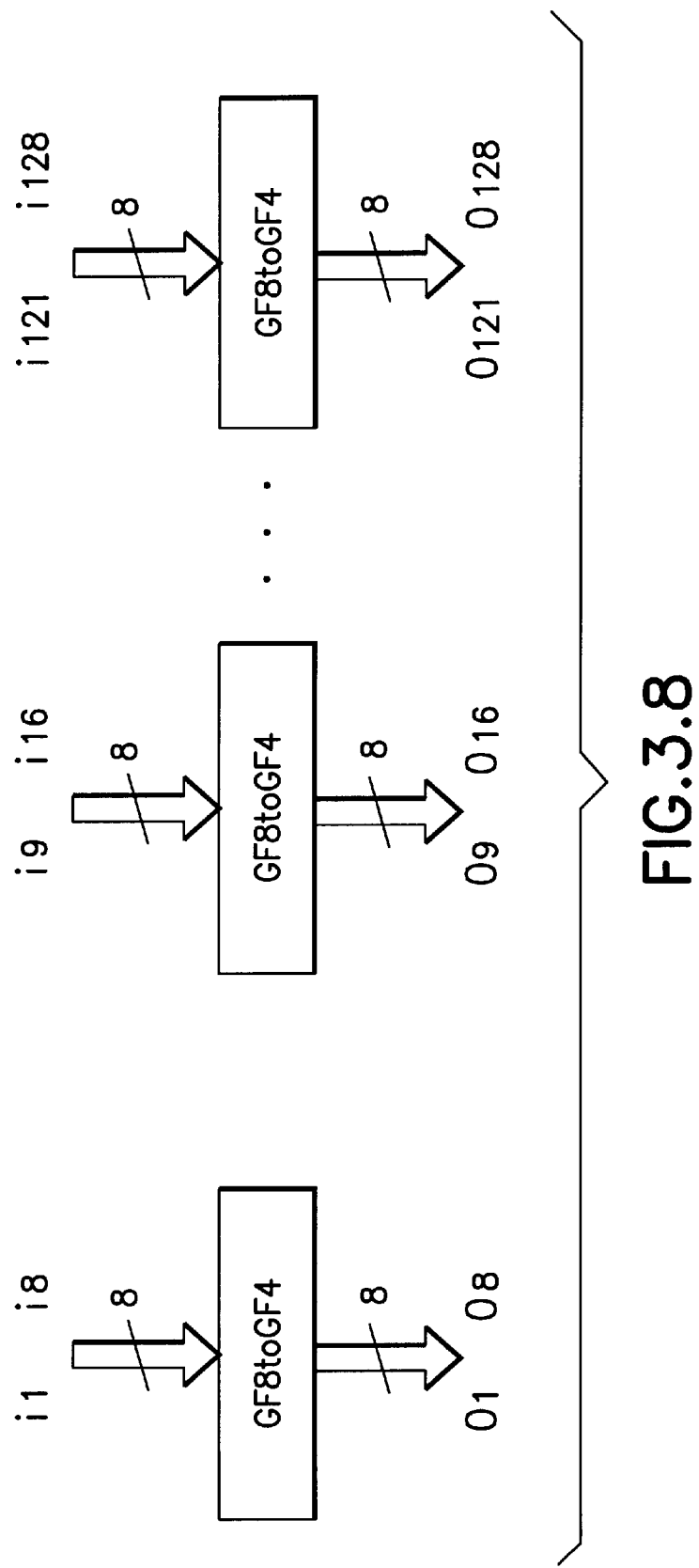
FIG.3.8

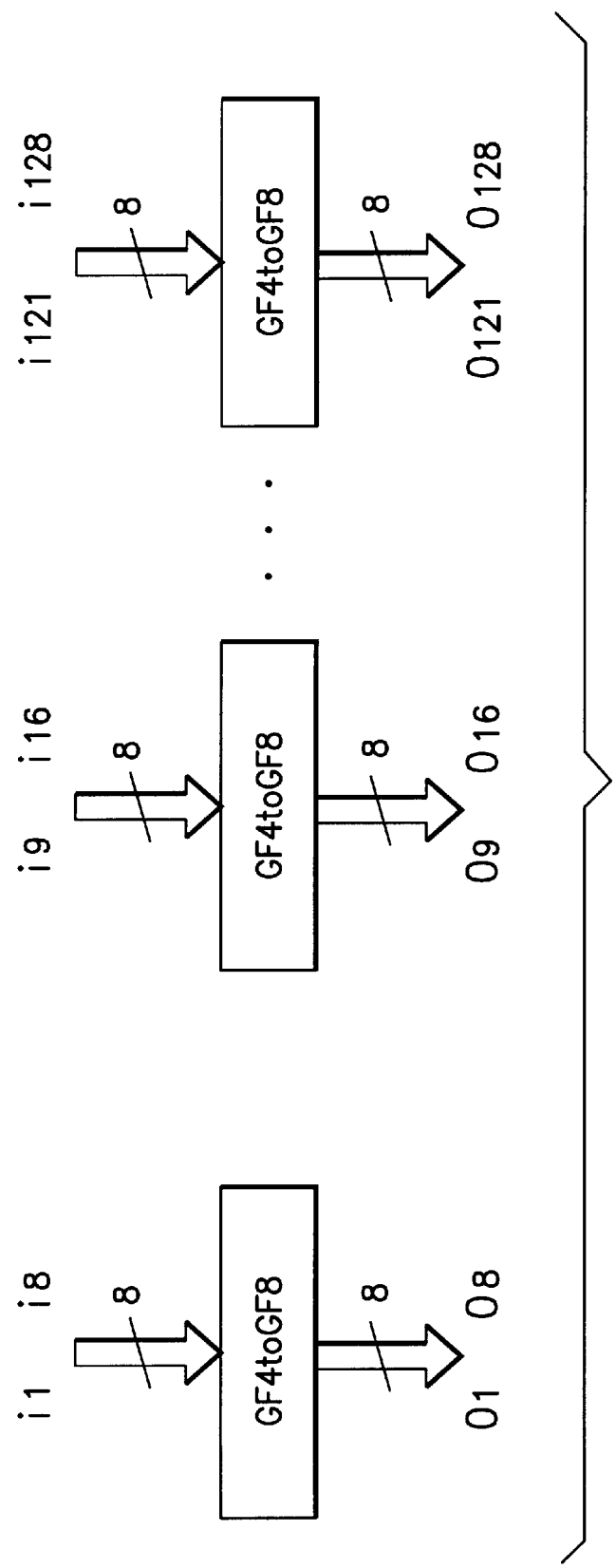
FIG.3.9

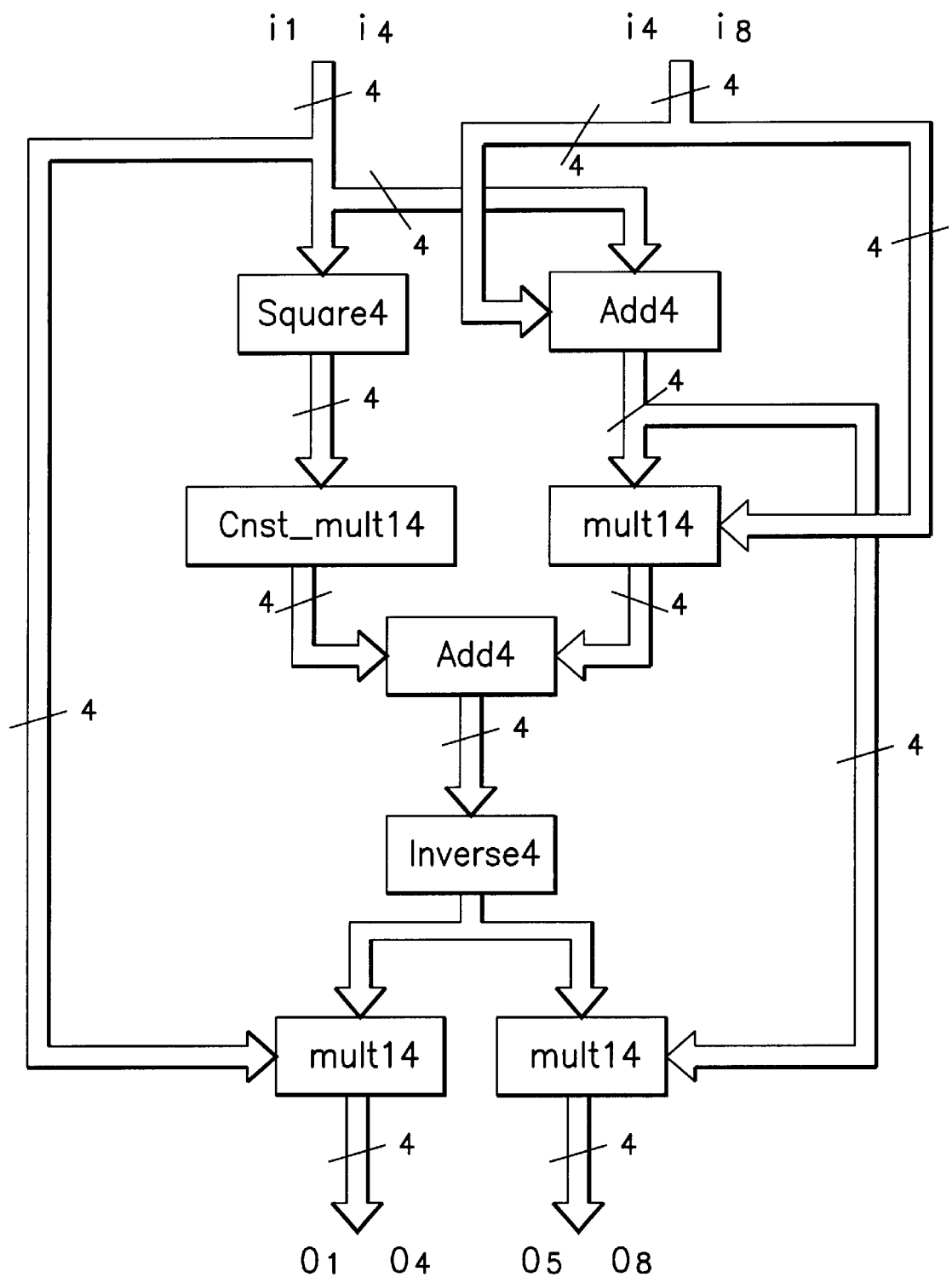
FIG.3.10

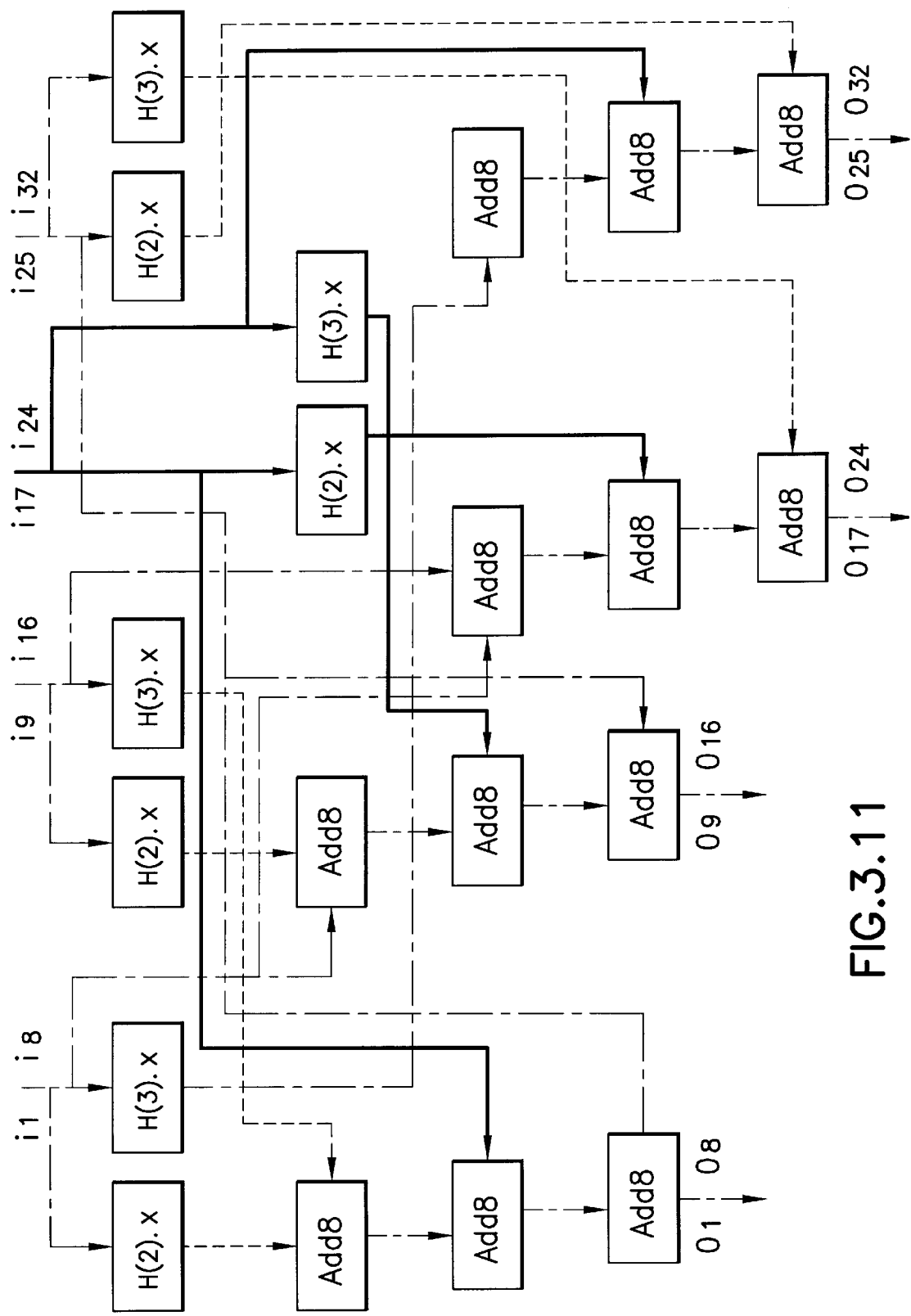
FIG.3.11

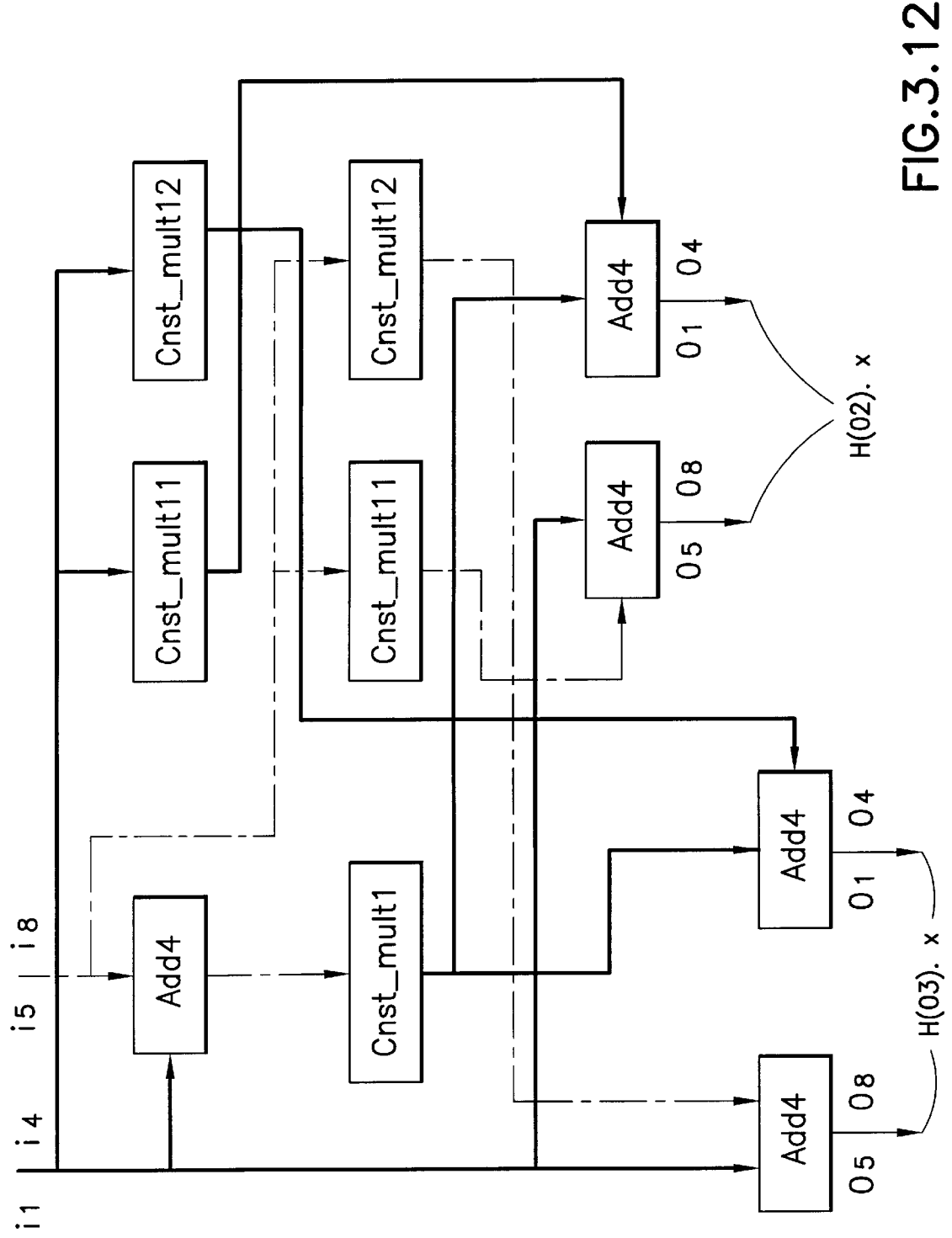
FIG.3.12

PROCESSING GALOIS FIELD ARITHMETIC

FIELD OF THE INVENTION

The invention relates to processing algorithms involving Galois Field arithmetic and relates particularly, though not exclusively, to the efficient execution of algorithms involving Galois Field arithmetic, as typically found in communications and cryptography applications.

BACKGROUND

A Galois Field is a finite set of elements in which addition, subtraction, multiplication and division (all appropriately defined) can be performed without leaving the set. Addition and multiplication must satisfy the commutative, associative and distributive laws. Galois Field arithmetic finds wide use in a variety of engineering applications, including error correcting codes and cryptography. For a concise and comprehensive exposition of Galois Fields, refer to Lidl and Niederreiter, *Introduction to Finite Fields and Their Applications*, Cambridge University Press, Cambridge, Mass., 1986.

In view of the varied applications noted above, there has been considerable attention given to efficient methods and apparatuses for Galois Field computations. In this respect, U.S. Pat. No. 5,689,452 issued to Cameron on Nov. 18, 1997 discloses a programmable digital computer with special-purpose logic units to efficiently perform Galois Field arithmetic. Cameron discloses a method of decoding Reed-Solomon codes in a large Galois Field $GF(2^n)$ in which the finite field is represented as a quadratic extension field of one or more subfields $GF(2^m)$. Basic arithmetic operations in the extension field are written solely in terms of operations performed in one or more subfields. Multiplicative operations performed in $GF(2^n)$ use only operations from $GF(2^m)$.

There have also been attempts to efficiently perform Galois Field arithmetic on general-purpose wide-word computers. A wide-word computer with a W-bit word can be looked upon as a SIMD (single instruction, multiple data) computer capable of operating upon one or more sets of k operands, each (W/k) bits wide, simultaneously with a common instruction. Computers with such architectures can be used to efficiently perform several computations in parallel and, accordingly, there are potential efficiency advantages that may be exploited. However, existing SIMD architectures are not ideally suited to performing Galois Field arithmetic as such architectures are not able to effectively perform operations typically associated with data manipulations executed when computing Galois Field operations.

Despite the work referred to above, there are limitations associated with existing techniques. Accordingly, a need clearly exists for a method . . . at least attempt to address these and other limitations associated with such techniques.

SUMMARY OF THE INVENTION

It is recognised that efficient parallel processing of algorithms involving Galois Field arithmetic can be achieved using an appropriate decomposition into corresponding operations in selected subfields.

Accordingly, a first aspect of the invention provides a method for processing algorithms involving Galois Field arithmetic suitable for execution by digital hardware able to process k-bit operands. This involves mapping source arithmetic operations in Galois Field $GF(2^n)$ into respective sets of corresponding arithmetic operations for a plurality of isomorphic composite Galois Fields $GF((2^{p[1]})^{p[2]}) \ldots )^{p[v]})$, for each of which $\pi^v_{i=1} p[i] = n$.

For each respective set of corresponding operations, a cost function relating to an implementation of the source arithmetic operations with the set of corresponding arithmetic operations is evaluated. As a result, one of the sets of corresponding arithmetic operations is selected as a target set of arithmetic operations, based on the calculated results of the cost function for each of the respective sets. Further, the source arithmetic operations of Galois Field $GF(2^n)$ are converted to the target set of arithmetic operations of the respective isomorphic composite Galois Field, the target arithmetic operations having k-bit operands.

In the described embodiment, the technique of data-slicing is used in combination with the mathematical technique of mapping arithmetic operations of the field $GF(2^n)$ in terms of operations in appropriately chosen subfields of $GF(2^n)$. Described embodiments enable Galois Field arithmetic to be effectively executed with SIMD computing architectures with relative efficiency and speed. An efficient implementation for any algorithm with Galois Field arithmetic can be derived where significant data-parallelism exists. Two examples of such an algorithm are Reed-Solomon decoders (generally described in Lin and Costello, *Error Control Coding*, Prentice Hall; ISBN: 013283796X, October 1982), and the recently selected Rijndael proposal for private key (symmetric key) cryptography.

Though there are advantages associated with implementing the described method with a data-sliced arrangement, such methods can also be executed on existing SIMD or non-SIMD architectures. The described methods are not restricted to the preferred Galois Field computer hardware architecture described herein, though there is a clear performance benefit available as the efficiency of the method depends on the architecture used.

The aspects of the invention attempt to provide an efficient implementation of applications involving Galois Field arithmetic in which there is the potential to exploit data parallelism with by performing relevant calculations with relatively greater computational efficiency.

BRIEF DESCRIPTION OF THE DRAWINGS

FIGS. 3.1 to 3.12 are schematic representations of the steps involved in performing a gate circuit implementation of the Rijndael algorithm, in accordance with an embodiment of the present invention.

DETAILED DESCRIPTION OF EMBODIMENTS

Figure 1:
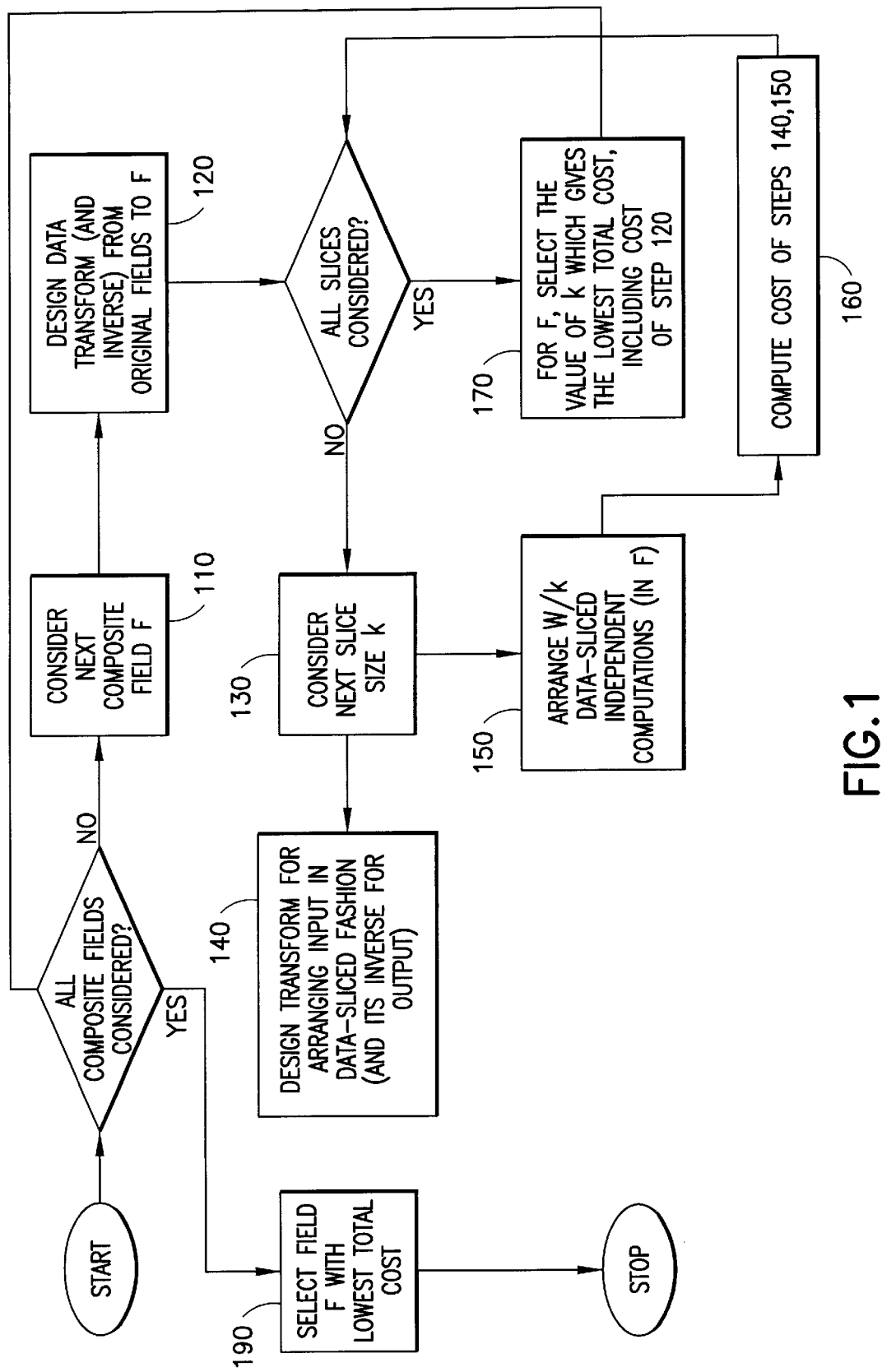
FIG. 1 is a schematic representation of the steps involved in determining the parameters for processing algorithms involving Galois Field calculations, in accordance with an embodiment of the present invention.

An embodiment of the invention is described in relation to the operation of computing hardware having a SIMD (single instruction, multiple data) architecture, for the execution of algorithms involving the calculation of Galois Field arithmetic. Such algorithms are typically encountered in communications applications, for example communications receivers which use Reed-Solomon decoders, and in cryptography.

The general operation of an embodiment of the techniques is initially provided, followed by an example implementation for a particular algorithm. In this case, for convenience and clarity of description, the algorithm with which the inventive techniques are illustrated in relation to the Rijndael algorithm for private-key cryptography systems.

Optimizing Galois Field computations usually involves transformation of the arithmetic involved into appropriate subfield operations and the resulting conversion of data between the respective field representations. The overall efficiency of the computation depends on the choice of fields and mappings etc. Finding a efficient implementation for the target hardware involves appropriately choosing these fields and mappings etc.

The described embodiment involves a recognition that wide-word architectures are particularly suited to Galois Field arithmetic, as a feature of Galois Fields is that arithmetic operations can be written in terms of operations in subfields. Depending upon the choice of subfield, many such mappings are possible. In accordance with embodiments of the invention a particular mapping (involving a particular subfield) can be identified as more efficiently implementable than others, depending upon the computation involved. Thus, arithmetic in any of a range of fields (subfields) can be determined, preferably calculated with relative efficiency by a programmable general-purpose architecture suitably for processing Galois Field arithmetic, as described below.

Galois Field Operations

Many encryption algorithms use exponentiation, which involves raising a number a (base) to some power e (exponent) mod p. In other words, $b=a^e$ mod p. Exponentiation is basically repeated multiplication (for example, $7^5=7.7.7.7.7$).

Arithmetic modulo q over polynomials of degree n can also be performed. This involves, for each term, computing values mod q and also limiting the size of the polynomials to degree n. By reducing modulo some irreducible polynomial of degree n+1, the result also forms a Galois Field $GF(q^n)$. The elements of the result are polynomials of degree (n−1) or lower: $a(x)=a_{n-1}x^{n-1}+a_{n-2}x^{n-2}+ \ldots +ax+a_0$.

An example of $GF(2^3)$ is now provided. In $GF(2^3)$ there are 8 elements: 0, 1, x, x+1, $x^2$, $x^2+1$, $x^2+x$, $x^2+x+1$. To compute the remainder when $d(x)=x^3+x+1$ one can simply replace $x^3$ with x+1.

Addition in $GF(q^n)$ involves summing equivalent terms in the polynomial modulo q. This is simply XOR if q=2 (as it is in binary systems). In other words, $a(x)+b(x)=(a_{n-1}+b_{n-1})x_{n-1}+ \ldots +(a_1+b_1)x+(a_0+b_0)$. Table below provides results of addition in $GF(2^3)$.

TABLE 1

| + | 000 | 001 | 010 | 011 | 100 | 101 | 110 | 111 |
|---|---|---|---|---|---|---|---|---|
| 0 = 000 | 000 | 001 | 010 | 011 | 100 | 101 | 110 | 111 |
| 1 = 001 | 001 | 000 | 011 | 010 | 101 | 100 | 111 | 110 |
| x = 010 | 010 | 011 | 000 | 001 | 110 | 111 | 100 | 101 |
| x + 1 = 011 | 011 | 010 | 001 | 000 | 111 | 110 | 101 | 100 |
| $x^2$ = 100 | 100 | 101 | 110 | 111 | 000 | 001 | 010 | 011 |
| $x^2$ + 1 = 101 | 101 | 100 | 111 | 110 | 001 | 000 | 011 | 010 |
| $x^2$ + x = 110 | 110 | 111 | 100 | 101 | 010 | 011 | 000 | 001 |
| $x^2$ + x + 1 = 111 | 111 | 110 | 101 | 100 | 011 | 010 | 001 | 000 |

Adding polynomials is performed by adding like coefficients, modulo q, which in this case is 2, as is typically the case. Polynomial multiplication in $GF(q^n)$ involves multiplying the two operand polynomials together. Shifts and XOR operations can be conveniently used in the case of q=2, when implementing in digital logic. Table 2 provides results of multiplication in $GF(2^3)$.

TABLE 2

| x | 001 | 010 | 011 | 100 | 101 | 110 | 111 |
|---|---|---|---|---|---|---|---|
| 1 = 001 | 001 | 010 | 011 | 100 | 101 | 110 | 111 |
| x = 010 | 010 | 100 | 110 | 011 | 001 | 111 | 110 |
| x + 1 = 011 | 011 | 110 | 101 | 111 | 100 | 001 | 010 |
| $x^2$ = 100 | 100 | 011 | 111 | 110 | 010 | 101 | 001 |
| $x^2$ + 1 = 101 | 101 | 001 | 100 | 010 | 111 | 011 | 110 |
| $x^2$ + x = 110 | 110 | 111 | 001 | 101 | 011 | 010 | 100 |
| $x^2$ + x + 1 = 111 | 111 | 101 | 010 | 001 | 110 | 100 | 011 |

As an example, consider multiplication in $GF(2^3)$, mod $x^3+x+1$:

$$(x+1).(x+1)=x.(x+1)+1.(x+1)=x^2+x+x+1=x^2+1.$$

In a corresponding binary representation:

$$011.011=011<<1 \text{ XOR } 011<<0=110 \text{ XOR } 011=101.$$

A further example is given below:

$$(x^2 + 1) \cdot (x^2 + x) \bmod x^3 + x + 1 = x^2 \cdot (x^2 + x) + 1 \cdot (x^2 + x)$$
$$= x^4 + x^3 + x^2 + x$$
$$= x \cdot (x^3 + x + 1) + 1 \cdot (x^3 + x + 1) + (x + 1)$$
$$= x + 1.$$

In a corresponding binary representation:

$$101.110 = 110 \ll 2 \text{ } XOR \text{ } 110 \ll 0 = 11000 \text{ } XOR \text{ } 110$$
$$= 11110 \bmod 1011 = 11110 \text{ } XOR \text{ } 1011 \ll 1$$
$$= 1000 \bmod 1011 = 1000 \text{ } XOR \text{ } 1011 = 011$$

In summary:
the operation of addition becomes an XOR operation of the binary representations,
eg $$(x^2+1)+(x^2+x+1)=x$$

101 XOR 111=010 multiplication becomes shift & XOR (ie long multiplication),
eg $$(x+1).(x^2+1)=x.(x^2+1)+1.(x^2+1)=x^3+x+x^2$$

011.101=(101)<<1 XOR (101)<<0=((1010 mod 1011) XOR (101 mod 1011)) mod 1011=001 XOR 101=100

Addition and multiplication operations performed in accordance with Galois Field arithmetic are used for performing an embodiment of the invention in the context of calculating the Rijndael algorithm.

Data Transformation for Data-Sliced Operation

Wide word computing architectures are well-known in the field of computer hardware design. In the context of embodiments described herein, data parallelism is matched appropriately with available SIMD architectural primitives through various data-slicing techniques. The disclosure of K. Diefendorff, P. Dubey, R. Hochsprung, and H. Scales, "*AltiVec Extension to PowerPC Accelerates Mediaprocessing*", IEEE Micro, March/April 2000, pp.

85–95, the contents of which are hereby incorporated by reference, provides a discussion of these techniques and is useful for implementing the data-slicing techniques that can be used with embodiments of the present invention.

Efficiency of Implementation on SIMD Architectures

A SIMD computing architecture is desirably used to provide a data-sliced implementation of the described Galois Field computations. In a data-sliced implementation, several independent instances of the underlying computation are performed in parallel. If the grain of the slicing is k bits, then the first k bits of all operands and results in all machine operations correspond to the first computation instance, the next k bits to the second instance, and so on. For k=1, this is the familiar bit-slicing technique.

As indicated above, this data slicing technique is beneficial where the underlying computation can be performed efficiently on a k-bit computer. In the case of computations involving Galois Field arithmetic, such benefits are obtained for several values of k. To do this $GF(2^n)$ operations are mapped to procedures that use $GF(2^m)$ operations for some m<n, such that those procedures can be efficiently implemented on a k-bit computer.

Such procedures are used as primitives to design for the computation an efficient implementation that targets a k-bit computer. Next, the wide-word computer is used to simultaneously simulate the working of a number (W/k) of k-bit computers, each performing an independent instance of the computation, where W is the number of bits in a word of the wide-word computer. This provides a work-efficient implementation for a W-bit computer—that is, the implementation averages k/W times as many cycles as the k-bit computer requires. Of course, there is an initial and final overhead to reorganize the data to and from the data sliced form.

The success and effectiveness of this method requires an efficient implementation of the computation for a k-bit computer. As indicated above, this can be achieved by mapping $GF(2^n)$ operations to subfield operations. Specifically, $GF(2^n)$ operations are performed in an isomorphic composite field, $GF((\ldots((2^{p[1]})^{p[2]})\ldots)^{p[v]})$ where $\pi^v_{1=i}p[i]=n$ $GF(2^n)$ operation to more than one $GF(2^{p[i]})$ operations.

However, these new operations are much more efficient than the corresponding operation in $GF(2^n)$ and the motivation is that the equivalent $GF((\ldots((2^{p[1]})^{p[2]})\ldots)^{p[v]})$ computation is much cheaper than the $GF(2^n)$ computation.

Another point of note is that there are many isomorphic fields possible for a given decomposition of n into p[i]'s depending on the underlying field polynomial chosen for each p[i], and the basis chosen for representation. Thus, selecting the appropriate decomposition of n and underlying field polynomials and basis gives an efficient implementation of the computation.

The theory of these relevant mathematical techniques is set out in Chapter 2 of Christof Paar's doctral thesis: Christof Paar, *Efficient VLSI Architectures for Bit-Parallel Computation in Galois Fields*, PhD Thesis, Institute for Experimental Mathematics, University of Essen, Germany, 1994, the contents of which are hereby incorporated by reference. For convenience, a reference to this work is provided at http://www.ece.wpi.edu/Research/crypt/theses/paar_thesispage.html. Christof Paar's thesis discusses composite fields and how to convert elements from one isomorphic field to another.

Measures of Efficiency

In view of the utility of SIMD computers in performing the described Galois Field computations, a consideration of the possible efficiencies is warranted. A wide-word computer is capable of an amount of computation proportional to the width of its word. For instance, a 128-bit computer can do 16 byte XORs in one instruction, while the same task would take 16 instructions on an 8-bit computer.

Here, the 128-bit computer works as a SIMD computer, performing 16 computations in parallel. However, for more complex computations a speedup may not be obtainable.

For example, a lookup of a 256-element table can be performed on an 8-bit computer in a single instruction by using indirection, but usually several table lookups on computers with wider words cannot be performed simultaneously. In other words, how to generally exploit the full capability of a wide-word computer is not obvious.

Before designing, or choosing between, competing implementations, a measure of efficiency is required. For illustration, the following notions are used to compare computations running on different target machines—the complexity of a computation is defined as the number of cycles taken, and the work done in a computation is defined as complexity×width of the computer's word in bits.

In the example above, a byte XOR requires 8 units of work on an 8-bit computer, while the 128-computer also requires 8 units of work for each XOR performed, thus achieving equal work. The potential computing power of a wide-word computer can be fully exploited by devising work-efficient computations which can be performed in SIMD fashion on the wide-word computer.

Overview

With reference to FIG. 1, an embodiment of the invention is described for generic algorithms. FIG. 1 illustrates a process combining data slicing with performing Galois Field operations in sub-fields to get an efficient SIMD implementation for Galois Field operations. Note that use of isomorphic composite fields involves:

Decomposing n into p[i]'s,

Selecting a field polynomial for each p[i],

Choosing a basis for representation.

In FIG. 1, a list of composite fields are each considered in turn at decision step 100. In step 110, if all composite fields have not been considered the next field F is considered. In step 120, a data transform and a corresponding inverse are designed to and from the original field to composite field F. For each field F, a number of data slices are considered.

The next data slice of width k is considered in step 130. For each tested data slice, a transform and a corresponding inverse transform is designed in step 140 for providing input in data sliced form, and re-arranging from data sliced form after computation in data sliced form. Then, in step 150, W/k data-sliced independent computations (in F) are arranged in SIMD fashion, in accordance with the transform designed in step 140. The cost associated with steps 140 and 150 is calculated in step 160 in accordance with a predetermined cost function, for the data slice of width k.

Once all data slices are considered for a given F, the data slice k with the lowest total associated cost in step 170. This involves determining the cost associated with step 120, and adding this calculated cost to that associated with steps 140 and 150 (as determined in step 170).

For a given field F and data slice k, once all composite fields are considered the combination with the lowest calculated cost can be finally calculated in step 190 before processing terminates.

The operations described in FIG. 1 are now explored in greater detail in relation to a cost function in which the underlying computation involves finding the multiplicative inverse of 16 $GF(2^8)$ numbers (in this case, the underlying polynomial is $x^8+x^4+x^3+x+1$). The target architecture is the Motorola Altivec or a similar architecture, for which W=128. The input and the output are stored as consecutive bytes in a 128-bit register.

As the objective is to obtain a fast Altivec implementation, the cost function of an opeartion θ, denoted by C(θ), is defined as the number of instructions for implementing θ on the target Altivec architecture.

In step 110, many composite fields are considered one by one. For each such field, various slices are considered in step 130. The subsequent cost evaluation in step 160 is illustrated in the following two examples.

The composite field under consideration is $GF((2^4)^2)$, with the underlying polynomials $x^4+x+1$ and $x^2+x+w^7$, where $w^4+w+=0$. Further, let k=1 be the slice size under consideration.

C(140), the cost associated with step 140, is taken to be 3072*(k/w)=24 instructions. This is so because a method is available to carry out the corresponding computation in a minimum 3072 instructions. That is, given W/k=128 instances of the input stored in 128 registers, a data-sliced rearrangement of this input can be output in 3072 instructions, again stored in 128 registers (note that data-slicing implies the use of W/k instances of the input). This number of instructions is divided by (W/k) as the value of interest (and which is sought to be minimimised) is the number of instructions per computation. Accordingly, the cost per computation is the appropriate measure for cost function comparisons.

The underlying computation in step 150 involves finding the inverses of 16 $GF(2^8)$ numbers. C(150), the cost associated with of block 150, is taken to be 16*137*(k/W). This is because a circuit for step 150 has been constructed using 16*137 gates, as later described. In this case, the number of gates is taken to be a cost measure because the computation in step 150 involves the working of such a gate circuit (since k is 1). 16*137 Altivec instructions can be used to emulate the working of 128 copies of this circuit in parallel.

Next, the cost associated with step 120. The transform in step 120 is multiplication with following matrix:

$$\begin{pmatrix} 1 & 0 & 1 & 0 & 0 & 0 & 0 & 0 \\ 1 & 0 & 1 & 0 & 1 & 1 & 0 & 0 \\ 1 & 1 & 0 & 1 & 0 & 0 & 1 & 0 \\ 0 & 1 & 1 & 1 & 0 & 0 & 0 & 0 \\ 0 & 0 & 0 & 1 & 1 & 0 & 1 & 0 \\ 0 & 0 & 1 & 0 & 0 & 0 & 0 & 0 \\ 0 & 1 & 1 & 1 & 0 & 1 & 1 & 0 \\ 1 & 1 & 0 & 1 & 1 & 1 & 1 & 1 \end{pmatrix}$$

This multiplication can be computed using a circuit with 16*25 gates. Since bit-sliced data (k=1) is used, the circuit can be emulated as in the case of step 150, which similarly gives a cost of 16*25*(k/W) associated with step 120.

In view of the above, the total cost computed in step 160 is:

$$F=(3072+16*137+16*25)*(k/W)=5664/128$$

In step 170, this total cost F, which corresponds to k=1, is compared with the relative costs associated with other values of k. It turns out that the cost for other values of k (not shown in this illustration) turns out to be higher, and accordingly k=1 is used.

For further illustration and comparison of cost, the case where the composite field is $GF((2^4)^2)$ is now considered, with underlying polynomials $x^4+x+1$ and $x^2+x+w^{14}$, where $w^4+w+1=0$. As before, this case is illustrated for k=1.

C(140) is, as before, 3072/128. It turns out that the transform in question does not change with the choice of polynomials. C(150)=16*134/128, since 16*134 is the number of gates in our circuit in this case (16 repetitions of FIG. 1 with $\lambda=w^{14}$).

C(120) turns out to be 16*26/128—the matrix in this case for block 300 is shown below.

$$\begin{pmatrix} 1 & 0 & 1 & 0 & 0 & 0 & 0 & 0 \\ 1 & 0 & 1 & 0 & 1 & 1 & 0 & 0 \\ 1 & 1 & 0 & 1 & 0 & 0 & 1 & 0 \\ 0 & 1 & 1 & 1 & 0 & 0 & 0 & 0 \\ 1 & 1 & 0 & 0 & 0 & 1 & 1 & 0 \\ 0 & 1 & 0 & 1 & 0 & 0 & 1 & 0 \\ 0 & 0 & 0 & 0 & 1 & 0 & 1 & 0 \\ 1 & 1 & 0 & 1 & 1 & 1 & 0 & 1 \end{pmatrix}$$

Again, k=1 is chosen in step 170, and the total cost in this case is 5632/128, which compares favourably to the cost in the previous example.

Inverse Calculation Algorithm and Code

The task of performing embodiments of the invention involves mapping arithmetic operations of the Galois Field $GF(2^n)$ to equivalent operations in appropriately chosen subfields of $GF(2^n)$. A computer for performing such operations desirably supports the architectural features described in detail below. For the purposes of illustrating a particular example embodiment through, set out directly below is a description of calculating the inverse of 16 $GF(2^8)$ elements (the word width is assumed to be 128 bits for the target hardware on which the operations are performed). The decomposition used is from $GF(2^8)$ to $GF((2^4)^2)$.

Figure 2:
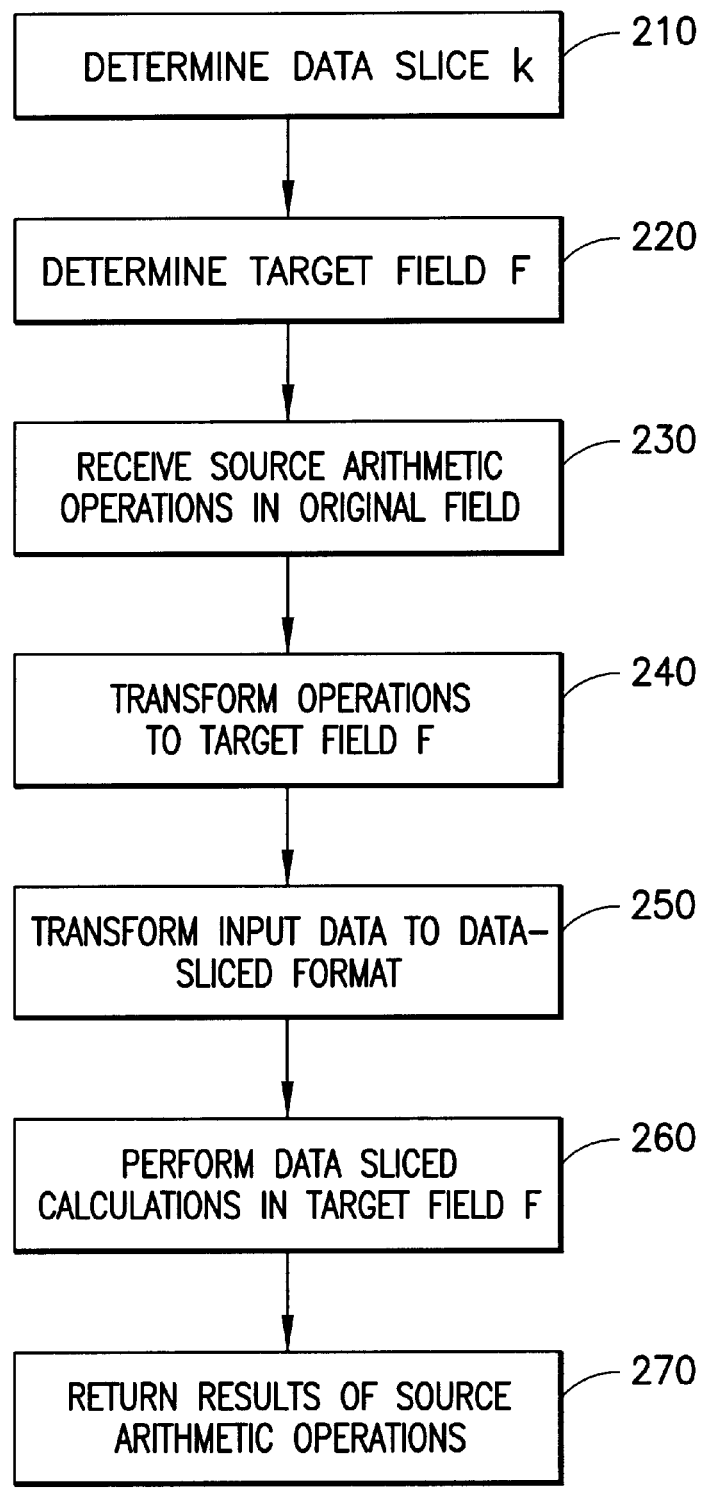
FIG. 2 is a flowchart illustrating the operations which occur in computing Galois Field operations in a SIMD architecture, in accordance with an embodiment of the present invention.

The process is schematically represented in overview in FIG. 2.

In step 210, the width of the data slice k is determined, as above. In step 220, the target field F is determined, also as above. Once these design decisions have been settled, the source arithmetic instructions are received in step 230. In step 240, these source instructions are transformed to corresponding arithmetic operations in the target field F, which is determined in step 220.

In step 250, the input data is transformed to a data-sliced format having a data width of k bits, which is determined in step 210. At this stage, the arithmetic operations are performed in the target field F in step 260. Once completed, the results of these source operations are returned in step 270, having been performed in the target field F.

Inversion in $GF((2^4)^2)$

Set out below in Table 3 is code for the inversion architecture for inversion in $GF((2^4)^2)$. The input and output are labelled by the registers. The shift operations are assumed to be of the form given below:

TABLE 3

```
/* n is the number of bits to be shifted */
a> Lshift(n, V1, V2)    /* V2=V<<n  */
b> Rshift(n, V1, V2)    /* V1=V2>>n */
```

A table lookup shown in Table 4 of the following form is also assumed:

TABLE 4

TBL(tab, V1, V2)  /* V2[i] = tab[V1[i]] , where tab contains the table */

Table 5 indicates the tables which are assumed to be stored for access as required:

TABLE 5

1. Log4   additive to multiplicative form table for GF($2^4$)
2. Alog4  multiplicative to additive form table for GF($2^4$)
3. Inv4   the inverse table for GF($2^4$)

The actual code is given directly below in Table 6.

TABLE 6

```
----------------------<code begin>----------------------
1.  Load(V1, mem_locn, 16)
        /* load 16 GF(2^8) numbers from the address
        'mem_locn' */
2.  TransformD(8, 4, V2, V1)
        /* V2 contains the corresponding GF((2^4)^2)
        elements of the GF(2^8) elements of V1 */
3.  Rshift (4, V3, V2)
        /* The GF(2^4) numbers in even indices will be
        ignored (indices start from 0) */
4.  Xor(V4, V2, V3)
        /* V4=V2<bit-xor>V3 */
5.  TBL (Log4, V3, V3)
5.  Addmod(4, V6, V3, V3)
        /* add elements of V3 to V3 mod (2^4–1) */
        /* V6 = Alog4[V3^2]*/
6.  LoadI(V5, 14, 8)
        /* Load the constant '14' into 16 bytes of V5 */
7.  Addmod(4, V5, V5, V6)
        /* V5 is the output of 'Cnst_mult4' */
9.  TBL (Alog4, V5, V5)
10. TBL(Log4, V4, V4)
11. TBL(Log4, V2, V2)
12. Addmod(4, V2, V2, V4)
13. TBL(Alog4, V2, V2)
        /* V2 is the output of 'Mult4[1]'   */
14. XOR(V2, V2, V5)
        /* V2 is the output of 'Add4[2]'   */
15. TBL(Inv4, V2, V2)
        /* V2 is the output of 'Inverse4'  */
16. TBL (Log4, V2, V2)
        /* Here V2 contains the multiplicative form of the
        output of Inverse4 V3 contains the multiplicative
        form of [i_1. .i_4] V4 contains the multiplicative
        form of the output of the operation Add4[1]   */
17. Addmod(4, V3, V3, V2)
18. Addmod(4, V2, V2, V4)
19. TBL(Alog4, V3, V3)
        /* V3 is the output of 'Mult4[2]'  */
20. TBL(Alog4, V2, V2)
        /* V2 is the output of 'Mult4[3]'  */
/* Now transform back to GF(2^8) */
21. LoadI(V4, 15, 8)
22. And(V2, V2, V4)                /* V2=V2&V4  */
23. And(V3, V3, V4)
24. Lshift(4, V1, V3)
25. XOR(V1, V1, V2)
26. TransformU(4, 8, V1, V1)
        /* Convert the GF((2^4)^2) elements to GF(2^8)
        elements */
----------------------<code end>----------------------
```

Implementation of Rijndael Algorithm

An example implementation is now described of the above method in the specific context of the Rijndael algorithm. As will be demonstrated, an efficient implementation of Rijndael is obtained, which is conveniently provided in data-sliced form for parallel computation on SIMD computing architectures.

The described implementation assumes the availability of multiple blocks of input data that can be encrypted in parallel. This is a valid assumption if the data blocks are from independent streams. This can be achieved for a single stream of data using a parallelizable encryption scheme for private key block ciphers (such as, for example, Rijndael) using the techniques described in Charanjit S. Jutla, "*Encryption Modes with Almost Free Message Integrity*", Cryptology ePrint Archive, Report 2000/039, 2000 (available at http://eprint.iacr.org/2000/039/), the contents of which are hereby incorporated by reference. Prior to this new scheme, encryption across blocks was forced to be serial in Cipher Block Chaining (CBC) mode and when authentication code (MAC) was desired.

In implementing the algorithm using the described techniques, the following design decisions were made:

1. All operations in Rijndael are in GF($2^8$).
2. The decomposition of n=8 as {p[1]=4, p[2]=2} is selected.
3. The polynomial $x^4+x+1$ is chosen as the field polynomial of GF($2^4$).
4. All primitive polynomials of the form $P(x)=x^2+x+\lambda$ (where $\lambda$ is an element of GF($2^4$)) are considered for p[2]=2. There are four such polynomials, which are: $\lambda=w^7, w^{11}, w^{13}, w^{14}$ where $w^4+w+1=0$.
5. For each P(x), 7 different transformation matrices are obtained (depending on the different basis chosen).
6. The cost function of an operation are chosen as gate count of its gate circuit implementation.
7. The following choices may be made by applying the method explained in FIG. 1:
   (a) Slice size k is chosen to be 1, as this corresponds with the lowest total cost.
   (b) $P(x)=x^2+x+w^{14}$, where w is the primitive element of GF($2^4$), is the polynomial selected, which also provides the lowest total cost.
1. The following transformation matrix was chosen:

$$\begin{pmatrix} 1 & 0 & 1 & 0 & 0 & 0 & 0 & 0 \\ 1 & 0 & 1 & 0 & 1 & 1 & 0 & 0 \\ 1 & 1 & 0 & 1 & 0 & 0 & 1 & 0 \\ 0 & 1 & 1 & 1 & 0 & 0 & 0 & 0 \\ 1 & 1 & 0 & 0 & 0 & 1 & 1 & 0 \\ 0 & 1 & 0 & 1 & 0 & 0 & 1 & 0 \\ 0 & 0 & 0 & 0 & 1 & 0 & 1 & 0 \\ 1 & 1 & 0 & 1 & 1 & 1 & 0 & 1 \end{pmatrix}$$

Gate Circuit Implementation

The gate circuit implementation of Rijndael is schematically illustrated in FIGS. 3.1 to 3.12, as described below with reference to these drawings. A corresponding software implementation can be obtained from the gate circuit by existing techniques, such as described in Eli Biham, *A fast new DES implementation in Software*, Technical Report CS0891, Computer Science Department, Technion—Israel Institute of Technology, 1997, the contents of which are hereby incorporated by reference.

FIGS. 3.1 to 3.12 collectively illustrate the operation of the gate circuit implementation for the Rijndael algorithm. The operation of the various blocks in these schematic representations is illustrated by the digital logic operations given below under the heading "Gate circuit functions" for the various blocks included in these drawings.

Gate Circuit Functions

The gate circuit of all operations can be given by Boolean expressions. For the operations schematically represented in the gate circuit implementation of FIGS. 3.1 to 3.12, the composition of the represented functions in terms of Boolean logic is given below.

The operation of the Rijndael algorithm is represented in FIG. 3.1 at the broadest level of abstraction. In this case, the number of rounds is denoted n, and the bytes are stored in column major form. The following drawings in FIGS. 3.2 to 3.12 sucessively define operations of FIG. 3.1 in terms of suboperations. Operations that are not defined in terms of suboperations are defined below in terms of digital logic expressions.

The Rijndael-impl block in FIG. 3.1 is represented in further detail in FIG. 3.2. Though the loop is shown unrolled in this case, it would of course be realised as a loop in an actual hardware implementation.

FIG. 3.3A represents the function of the Round$_i$ block in FIG. 3.2, for $1 \leq i < n$, while FIG. 3.3B represents the Round$_n$ block in FIG. 3.2.

FIG. 3.4 represents the Byte_Sub operation of the Round operation of FIGS. 3.3A and 3.3B, while FIG. 3.5 represents the Shift_Row operation of the Round operation of FIGS. 3.3A and 3.3B. Shift_Row does not require any gates for implementation. The transform in this case is for a key length of 128 bits. FIG. 3.6 represents the Add_Round_Key operation of the Round operation of FIGS. 3.3A and 3.3B. FIG. 3.7 represents the Mix_Column operation of the Round operation of FIG. 3.3A.

FIG. 3.8 represents the Transform operation of FIGS. 3.1 and 3.2. Similarly, FIG. 3.9 represents the Inverse_Transform operation of FIG. 3.1.

FIG. 3.10 represents the Inverse8 operation of the Byte_Sub operation shown in FIG. 3.4.

FIG. 3.11 represents the Linear_Comb operation of the Mixed_Column operation of FIG. 3.7. All data paths are 8 bits wide.

FIG. 3.12 represents the H(03).x and H(02).x operations of the Linear_Comb operation in FIG. 3.11. All data paths are 4 bits wide.

For operations in FIGS. 3.1 to 3.12 that are not otherwise define most specifically in terms of other operations, digital logic implementations are provided below under a designated heading for each such operation.

In the notation used below, logical operations are denoted as indicated. When an operation has 2 operands, then the operands are referred by the symbols 'a' and 'b'. The requested functions are:

'^' denotes the XOR operation,

'&' denotes the AND operation,

'!' denotes the NOT operation, i[j] is used to represent i$_j$, o[j] is used to represent o$_j$.

GF8toGF4 operation:

```
gate[0]  = i[1] ^ i[3];
gate[1]  = i[1] ^ i[6];
gate[2]  = i[2] ^ i[4];
gate[3]  = i[2] ^ i[7];
gate[4]  = i[5] ^ i[7];
gate[5]  = gate[1] ^ i[5];
gate[6]  = gate[2] ^ i[7];
gate[7]  = gate[2] ^ i[3];
gate[8]  = gate[1] ^ gate[3];
gate[9]  = gate[2] ^ i[8];
gate[10] = gate[5] ^ i[3];
gate[11] = gate[6] ^ i[1];
gate[12] = gate[5] ^ gate[9];
o[1] = gate[0];
o[2] = gate[10];
o[3] = gate[11];
o[4] = gate[7];
o[5] = gate[8];
o[6] = gate[6];
o[7] = gate[4];
o[8] = gate[12];
```

GF4toGF8 operation

```
gate[0]  = i[1] ^ i[3];
gate[1]  = i[2] ^ i[4];
gate[2]  = i[3] ^ i[6];
gate[3]  = i[5] ^ i[7];
gate[4]  = i[3] ^ i[7];
gate[5]  = gate[0] ^ i[4];
gate[6]  = i[2] ^ gate[3];
gate[7]  = gate[1] ^ gate[3];
gate[8]  = gate[0] ^ i[6];
gate[9]  = gate[1] ^ gate[4];
gate[10] = gate[1] ^ i[8];
gate[11] = gate[6] ^ gate[8];
gate[12] = gate[5] ^ i[7];
o[1] = gate[2];
o[2] = gate[11];
o[3] = gate[8];
o[4] = gate[7];
o[5] = gate[12];
o[6] = gate[9];
o[7] = gate[5];
o[8] = gate[10];
```

Square4 operation

```
gate[0] = i[1] ^ i[3];
gate[1] = i[2] ^ i[4];
o[1] = i[1];
o[2] = gate[0];
o[3] = i[2];
o[4] = gate[1];
```

Add4 operation

```
gate [1] = a [1] ^ b [1];
gate [2] = a [2] ^ b [2];
gate [3] = a [3] ^ b [3];
gate [4] = a [4] ^ b [4];
O [1] = gate [1];
O [2] = gate [2];
O [3] = gate [3];
O [4] = gate [4];
```

Add8 operation

```
gate [1] = a [1] ^ b [1];
gate [2] = a [2] ^ b [2];
gate [3] = a [3] ^ b [3];
gate [4] = a [4] ^ b [4];
gate [5] = a [5] ^ b [5];
gate [6] = a [6] ^ b [6];
gate [7] = a [7] ^ b [7];
gate [8] = a [8] ^ b [8];
O [1] = gate [1];
O [2] = gate [2];
O [3] = gate [3];
O [4] = gate [4];
O [5] = gate [5];
O [6] = gate [6];
O [7] = gate [7];
O [8] = gate [8];
```

Mult4 operation

```
gate [0] = a [3] ^ a [2];
gate [1] = a [2] ^ a [1];
gate [2] = a [1] ^ a [4];
gate [3] = gate [2] & b [1];
gate [4] = a [3] & b [2];
gate [5] = a [2] & b [3];
gate [6] = a [1] & b [4];
gate [7] = gate [1] & b [1];
gate [8] = gate [2] & b [2];
```

-continued

```
gate [9]  = a [3]   & b [3];
gate [10] = a [2]   & b [4];
gate [11] = gate [0] & b [11];
gate [12] = gate [1] & b [2];
gate [13] = gate [2] & b [3];
gate [14] = a [3]   & b [4];
gate [15] = a [3]   & b [1];
gate [16] = a [2]   & b [2];
gate [17] = a [1]   & b [3];
gate [18] = a [4]   & b [4];
gate [19] = gate [3]  ^ gate [4];
gate [20] = gate [5]  ^ gate [6];
gate [21] = gate [7]  ^ gate [8];
gate [22] = gate [9]  ^ gate [10];
gate [23] = gate [11] ^ gate [12];
gate [24] = gate [13] ^ gate [14];
gate [25] = gate [15] ^ gate [16];
gate [26] = gate [17] ^ gate [18];
gate [27] = gate [19] ^ gate [20];
gate [28] = gate [21] ^ gate [22];
gate [29] = gate [23] ^ gate [24];
gate [30] = gate [25] ^ gate [26];
o [1] = gate [27];
o [2] = gate [28];
o [3] = gate [29];
o [4] = gate [30];
```

Inverse4 operation

```
gate [0] = !i [4];
gate [1] = !i [2];
gate [2] = i [2]   ^ i [1];
gate [3] = i [4]   ^ i [3];
gate [4] = i [3]   & i [2];
gate [5] = i [4]   ^ i [1];
gate [6] = i [3]   ^ i [2];
gate [7] = i [4]   & i [3];
gate [8] = i [4]   & i [2];
gate [9]  = gate [3] & gate [1];
gate [10] = gate [4] & gate [5];
gate [11] = i [4]    & gate [6];
gate [12] = gate [2] & i [3];
gate [13] = !gate [7];
gate [14] = gate [8] & i [1];
gate [15] = gate [2] & gate [0];
gate [16] = i [3]    & i [1];
gate [17] = gate [2] ^ gate [9];
gate [18] = gate [11] ^ gate [12];
gate [19] = gate [13] & i [1];
gate [20] = gate [7]  ^ gate [14];
gate [21] = gate [16] & gate [1];
gate [22] = gate [6]  ^ gate [21];
gate [23] = gate [17] ^ gate [10];
gate [24] = gate [18] ^ gate [19];
gate [25] = gate [20] ^ gate [15];
gate [27] = i [4]    ^ i [2];
gate [28] = !gate [27];
gate [29] = gate [28] & i [1];
gate [26] = gate [29] ^ gate [22];
o [4] = gate [23];
o [3] = gate [24];
o [2] = gate [25];
o [1] = gate [26];
```

Cnst_mult14 operation

```
gate [0] = i [4] ^ i [3];
o [4] = gate [0];
o [3] = i [2];
o [2] = i [1];
o [1] = i [4];
```

Cnst_mult1 operation

```
gate [0] = i [4] ^ i [1];
o [4] = i [1];
o [3] = gate [0];
o [2] = i [3];
o [1] = i [2];
```

-continued

Cnst_mult11 operation

```
gate [0] = i [4] ^ i [3];
gate [1] = i [2] ^ i [1];
gate [2] = i [3] ^ gate [1];
gate [3] = gate [0] ^ i [2];
gate [4] = gate [0] ^ gate [1];
o [4] = gate [2];
o [3] = gate [0];
o [2] = gate [3];
o [1] = gate [4];
```

Cnst_mult12 operation

```
gate [0] = i [4] ^ i [3];
gate [1] = i [2] ^ gate [0];
gate [2] = gate [1] ^ i [1];
o [4] = gate [2];
o [3] = i [4];
o [2] = gate [0];
o [1] = gate [1];
```

Affine operation

```
gate [0] = i [1] ^ i [7];
gate [1] = i [3] ^ i [6];
gate [2] = i [4] ^ i [6];
gate [3] = i [2] ^ gate [2];
gate [4] = gate [0] ^ i [3];
gate [5] = gate [1] ^ i [8];
gate [6] = gate [0] ^ i [5];
gate [7] = !i [5];
gate [8] = !gate [3];
gate [9] = !gate [6];
o [1] = gate [7];
o [2] = gate [8];
o [3] = gate [4];
o [4] = gate [5];
o [5] = i [1];
o [6] = gate [1];
o [7] = gate [9];
o [8] = gate [2];
```

Proposed Computing Architecture

A computing architecture for a computer designed to support efficient processing of Galois Field arithmetic executed in accordance with the described embodiment is now described. Such an architecture desirably includes the following architectural features listed below.

Load/Store: from memory to a set of processor registers

Common logical operations: such as, OR, and, XOR, inter-intra element rotate, etc.

SIMD mode: in which, any operational primitive is supported with an explicit or implicit Galois Field width. For example, consider a 128-bit datapath wide SIMD architecture. A primitive such as, Add4 V1, V2, V3, could mean the following: "Add the elements of Registers V1 with those of register V2, and store the result in register V3; assume operands to be elements of $GF(2^4)$". In other words, 32 elements, each nibble wide are added.

Table-lookup support: In implicit form such support can be found in existing techniques, such as through 'permute' primitive in K. Diefendorff, P. Dubey, R. Hochsprung, and H. Scales, "*AltiVec Extension to PowerPC Accelerates Mediaprocessing*", IEEE Micro, March/April 2000, pp. 85–95. However, this architecture support is proposed in explicit form in the described embodiment and can be designed efficiently using existing techniques, such as those used in the implementation of architecture described in the reference above.

The above features are desirable in computing environments which implement the techniques described above. An implementation including the above architectural features provides an efficient platform for the techniques described above for executing algorithms involving Galois Field arithmetic.

Computer Hardware

Figure 4:
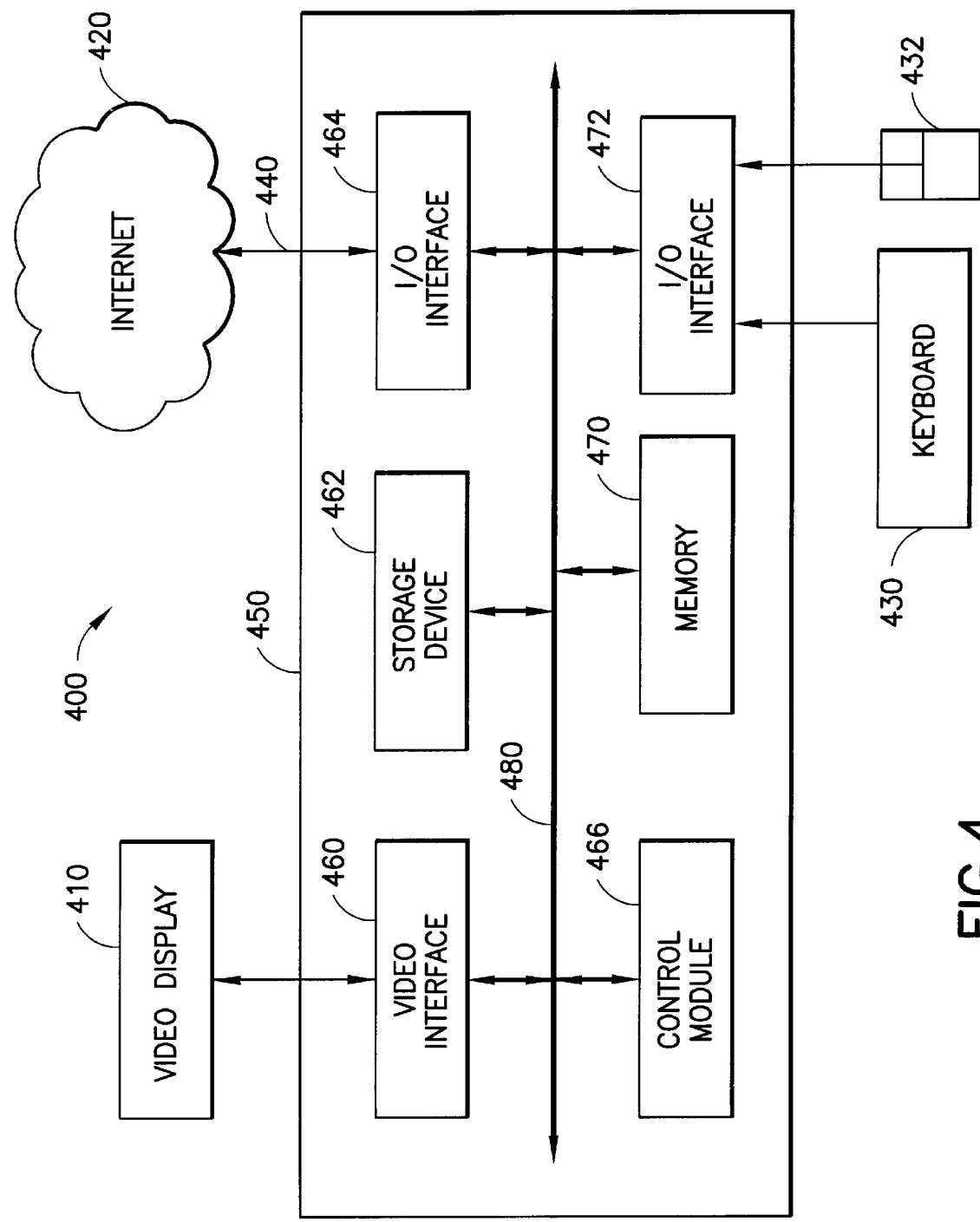
FIG. 4 is a schematic representation of a computer system able to perform preferred embodiments of the invention.

A computer system 400, schematically represented in FIG. 4, is provided with the computing architectural features outlined directly above. Preferably, such a computer system 1000 is used to execute Galois Field operations as described. However, as noted above, embodiments of the invention can be implemented using any conventional SIMD architecture, or indeed any existing general purpose (for example, non-SIMD) computing architecture. The process described above can be implemented as software, or computer readable program code, executing on the computer system 400.

The computer system 400 includes a computer 450, a video display 410, and input devices 430, 432. In addition, the computer system 400 can have any of a number of other output devices including line printers, laser printers, plotters, and other reproduction devices connected to the computer 450. The computer system 400 can be connected to one or more other computers via a communication input/output (I/O) interface 464 using an appropriate communication channel 440 such as a modem communications path, an electronic network, or the like. The network may include a local area network (LAN), a wide area network (WAN), an Intranet, and/or the Internet 420.

The computer 450 includes the control module 466, a memory 470 that may include random access memory (RAM) and read-only memory (ROM), input/output (I/O) interfaces 464, 472, a video interface 460, and one or more storage devices generally represented by the storage device 462. The control module 466 is implemented using a central processing unit (CPU) that executes or runs a computer readable program code that performs a particular function or related set of functions.

The video interface 460 is connected to the video display 410 and provides video signals from the computer 450 for display on the video display 410. User input to operate the computer 450 can be provided by one or more of the input devices 430, 432 via the I/O interface 472. For example, a user of the computer 450 can use a keyboard as I/O interface 430 and/or a pointing device such as a mouse as I/O interface 432. The keyboard and the mouse provide input to the computer 450. The storage device 462 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 450 is typically connected to other devices via a bus 480 that in turn can consist of data, address, and control buses.

The method steps are effected by instructions in the software that are carried out by the computer system 400. Again, the software may be implemented as one or more modules for implementing the method steps.

In particular, the software may be stored in a computer readable medium, including the storage device 462 or that is downloaded from a remote location via the interface 464 and communications channel 440 from the Internet 420 or another network location or site. The computer system 400 includes the computer readable medium having such software or program code recorded such that instructions of the software or the program code can be carried out. The use of the computer system 400 preferably effects advantageous apparatuses for processing algorithms involving Galois Field arithmetic.

The computer system 400 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 466. Intermediate storage of the program code and any data including entities, tickets, and the like may be accomplished using the memory 470, possibly in concert with the storage device 462.

In some instances, the program may be supplied to the user encoded on a CD-ROM or a floppy disk (both generally depicted by the storage device 462), or alternatively could be read by the user from the network via a modem device connected to the computer 450. Still further, the computer system 400 can load the software from other computer readable media. This may include magnetic tape, a ROM or integrated circuit, a magneto-optical disk, a radio or infra-red transmission channel between the computer and another device, a computer readable card such as a PCMCIA card, and the Internet 420 and Intranets including email transmissions and information recorded on Internet sites and the like. The foregoing are merely examples of relevant computer readable media. Other computer readable media may be practised without departing from the scope and spirit of the invention.

Further to the above, the described methods can be realised in a centralised fashion in one computer system 400, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

It is to be understood that the invention is not limited to the embodiment described, but that various alterations and modifications, as would be apparent to one skilled in the art, are included within the scope of the invention.

We claim:

1. A method of processing calculations for algorithms involving Galois Field arithmetic, the method comprising the steps of:

using mapping circuitry to map one or more source arithmetic operations in Galois Field $GF(2^n)$ into sets of corresponding arithmetic operations for a plurality of respective isomorphic composite Galois Fields $GF((2^{p[1]})^{p[2]})\ldots)^{p[v]})$, for one or more of each unique decomposition of n into p[i]s such that $$\prod_{i=1}^{v} p[i] = n;$$

using evaluation circuitry to evaluate, for each respective set of corresponding operations, a field cost function relating to an implementation of the source arithmetic operations with the set of corresponding arithmetic operations; and using selection circuitry to select one of the sets of corresponding arithmetic operations as a target set of arithmetic operations, based on calculated results of an aggregate cost function based on the field cost function for each of the respective sets.

2. The method as claimed in claim 1, further comprising the steps of:

determining a data transformation for arranging data operands of said one or more source arithmetic operations into data-sliced format having k-bit operands, for the respective sets of corresponding arithmetic operations;

evaluating, for each respective set of corresponding operations, a data cost function relating to said data transformation; and calculating the aggregate cost function as a sum of the data cost function and the field cost function.

3. The method as claimed in claim 1, further comprising the step of:

simultaneously executing W/k of said target set of corresponding arithmetic operations for k-bit operands on W-bit digital computer hardware;

wherein the results of said arithmetic operations in Galois Field GF($2^n$) are obtained in k/W as many cycles of the W-bit computer compared with execution of the corresponding operations on a k-bit computer.

4. The method as claimed in claim 1, wherein the aggregate cost function is representative of the relative computational efficiency of performing the source arithmetic operations as a set of corresponding arithmetic operations in a respective isomorphic composite Galois Field.

5. The method as claimed in claim 1, wherein the cost function is representative of the hardware design efficiency of performing the source arithmetic operations as a set of corresponding arithmetic operations in a respective isomorphic composite Galois Field.

6. The method as claimed in claim 1, wherein the cost function is representative of the number of gates required in a gate circuit implementation of the source arithmetic operations as a set of corresponding arithmetic operations in a respective isomorphic composite Galois Field.

7. The method as claimed in claim 1, wherein the target set having the lowest associated result of the aggregate cost function is selected from the sets of corresponding arithmetic operations.

8. The method of processing calculations for algorithms involving Galois Field arithmetic suitable, the method comprising steps of:

using mapping circuitry to map a source set of one or more source arithmetic operations in Galois Field GF($2^n$) into a target set of corresponding arithmetic operations for an identified isomorphic composite Galois Field GF($(2^{p[1]})^{p[2]}) \ldots )^{p[v]}$), for which $$\prod_{i=1}^{v} p[i] = n;$$

using performance circuitry to perform said corresponding arithmetic operations comprising said target set; and using computing circuitry to obtain the results of said source arithmetic operations comprising said source set, based upon the results of said corresponding arithmetic operations comprising said target set;

wherein said identified isomorphic composite Galois Field GF($(2^{p[1]})^{p[2]}) \ldots )^{p[v]}$) has been selected from a plurality of such isomorphic composite Galois Fields which each represent a unique decomposition of n into p[i]s such that $$\prod_{i=1}^{v} p[i] = n.$$

9. The method as claimed in claim 8, wherein said selection of the identified isomorphic composite Galois Field is performed by steps of:

mapping one or more source arithmetic operations in Galois Field GF($2^n$) into respective sets of corresponding arithmetic operations for a plurality of isomorphic composite Galois Fields GF($(2^{p[1]})^{p[2]}) \ldots )^{p[v]}$) for unique decompositions of n into a set of p[i]s such that $$\prod_{i=1}^{v} p[i] = n;$$

evaluating, for each respective set of corresponding operations, a field cost function relating to an implementation of the source arithmetic operations with the set of corresponding arithmetic operations; and selecting one of the sets of corresponding arithmetic operations as a target set of arithmetic operations, based on calculated results of an aggregate cost function based on the field cost function for each of the respective sets.

10. The method as claimed in claim 9, further comprising the steps of:

determining a data transformation for arranging data operands of said one or more source arithmetic operations into data-sliced format having k-bit operands, for the respective sets of corresponding arithmetic operations;

evaluating, for each respective set of corresponding operations, a data cost function relating to said data transformation; and calculating the aggregate cost function as a sum of the data cost function and the field cost function.

11. The method as claimed in claim 9, wherein the aggregate cost function is representative of the relative computational efficiency of performing the source arithmetic operations as a set of corresponding arithmetic operations in a respective isomorphic composite Galois Field.

12. The method as claimed in claim 9, wherein the cost function is representative of the hardware design efficiency of performing the source arithmetic operations as a set of corresponding arithmetic operations in a respective isomorphic composite Galois Field.

13. The method as claimed in claim 9, wherein the field cost function is representative of the number of gates required in a gate circuit implementation of the source arithmetic operations as a set of corresponding arithmetic operations in a respective isomorphic composite Galois Field.

14. The method as claimed in claim 9, wherein the target set having the lowest associated result of the aggregate cost function is selected from the sets of corresponding arithmetic operations.

15. The method as claimed in claim 8, further comprising the step of:

simultaneously executing W/k of said target set of corresponding arithmetic operations for k-bit operands on W-bit digital computer hardware;

wherein the results of said arithmetic operations in Galois Field GF($2^n$) are obtained in k/W as many cycles of the W-bit computer compared with execution of the corresponding operations on a k-bit computer.

16. The method as claimed in claim 8, wherein the algorithm is the Rijndael algorithm.

17. The method as claimed in claim 16, wherein n is 8 such that the arithmetic operations for the Rijndael algorithm are in Galois Field $GF(2^8)$.

18. The method as claimed in claim 17, wherein the isomorphic composite Galois Field is $GF(2^4)^2)$ in which p[1] is 4 and p[2] is 2.

19. The method as claimed in claim 18, wherein for the isomorphic composite Galois Field is $GF((2^4)^2)$, p[1] has a corresponding field polynomial of $x^4+x+1$ and p[2] has a corresponding field polynomial of $x^2+x+W^{14}$ for which $w^4+w+1=0$.

20. The method as claimed in claim 19, wherein W of said target set of corresponding arithmetic operations are executed in parallel using W-bit digital computer hardware for 1-bit operands.

21. An apparatus for processing calculations for algorithms involving Galois Field arithmetic suitable, the apparatus comprising:

mapping circuitry operable for mapping a source set of one or more source arithmetic operations in Galois Field $GF(2^n)$ into a target set of corresponding arithmetic operations for an identified isomorphic composite Galois Field $GF((2^{p[1]})^{p[2]}) \ldots {}^{p[v]})$, for which $$\prod_{i=1}^{v} p[i] = n;$$

performance circuitry operable for performing said corresponding arithmetic operations comprising said target set; and computing circuitry operable for obtaining the results of said source arithmetic operations comprising said source set, based upon the results of said corresponding arithmetic operations comprising said target set;

wherein said identified isomorphic composite Galois Field $GF((2^{p[1]})^{p[2]}) \ldots {}^{p[v]})$ has been selected from a plurality of such isomorphic composite Galois Fields which each represent a unique decomposition of n into p[i]s such that $$\prod_{i=1}^{v} p[i] = n.$$

22. A computer program for processing calculations for algorithms involving Galois Field arithmetic suitable, the computer program comprising:

code means for mapping a source set of one or more source arithmetic operations in Galois Field $GF(2^n)$ into a target set of corresponding arithmetic operations for an identified isomorphic composite Galois Field $GF((2^{p[1]})^{p[2]}) \ldots {}^{p[v]})$, for which $$\prod_{i=1}^{v} p[i] = n,$$

code means for performing said corresponding arithmetic operations comprising said target set; and code means for obtaining the results of said source arithmetic operations comprising said source set, based upon the results of said corresponding arithmetic operations comprising said target set;

wherein said identified isomorphic composite Galois Field $GF((2^{p[1]})^{p[2]}) \ldots {}^{p[v]})$ has been selected from a plurality of such isomorphic composite Galois Fields which each represent a unique decomposition of n into p[i]s such that $$\prod_{i=1}^{v} p[i] = n.$$

* * * * *